(12) United States Patent
Bulut et al.

(10) Patent No.: US 12,547,707 B2
(45) Date of Patent: Feb. 10, 2026

(54) CONNECTING NATURAL AND SECURITY LANGUAGE IN THE EMBEDDING SPACE FOR BETTER THREAT HUNTING AND INCIDENT RESPONSE

(71) Applicant: MICROSOFT TECHNOLOGY LICENSING, LLC, Redmond, WA (US)

(72) Inventors: Muhammed Fatih Bulut, Cambridge, MA (US); Aditi Kamlesh Shah, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 165 days.

(21) Appl. No.: 18/340,708

(22) Filed: Jun. 23, 2023

(65) Prior Publication Data

US 2024/0427879 A1    Dec. 26, 2024

(51) Int. Cl.
*G06F 21/55*     (2013.01)
*G06F 16/2452*   (2019.01)

(52) U.S. Cl.
CPC ...... *G06F 21/552* (2013.01); *G06F 16/24522* (2019.01); *G06F 2221/2101* (2013.01)

(58) Field of Classification Search
CPC ............. G06F 21/552; G06F 16/24522; G06F 2221/2101
See application file for complete search history.

(56) References Cited

U.S. PATENT DOCUMENTS

| 11,444,978  | B1  |   | 9/2022  | Liao |  |
|---|---|---|---|---|---|
| 12,267,345  | B1  | * | 4/2025  | Erlingsson | ............ G06F 9/5072 |
| 2018/0248902 | A1 |   | 8/2018  | Dănilă-dumitrescu et al. |  |
| 2022/0279014 | A1 | * | 9/2022  | Stokes, III | .............. G06F 21/56 |
| 2022/0318255 | A1 |   | 10/2022 | Fei |  |
| 2023/0076127 | A1 |   | 3/2023  | Yu |  |
| 2024/0330446 | A1 |   | 10/2024 | Bulut |  |
| 2024/0404243 | A1 | * | 12/2024 | Zhao | ................... G06F 16/3329 |

(Continued)

OTHER PUBLICATIONS

Constantin Adam, Attack Techniques and Threat identification for Vulnerabilities, Jun. 22, 2022 (Year: 2022).*

(Continued)

*Primary Examiner* — Linglan Edwards
*Assistant Examiner* — Jacob Benedict Knackstedt
(74) *Attorney, Agent, or Firm* — Tyler Thorp; Newport IP, LLC

(57) ABSTRACT

Methods and apparatuses for improving the speed, quality, and relevance of automated responses provided by a question answering system for security data are described. The question answering system may generate and utilize a large language model that is trained to combine the language of security data, such as the language found in security logs and alerts, with natural language text. Given an input prompt (or a search query) from an end user of the question answering system, the question answering system may identify relevant content from the security data and display a response based on the relevant content. The question answering system may allow the end user of the question answering system to query security logs using natural language text without requiring the end user to provide a structured query and without requiring the security data be parsed and ingested into a database system.

14 Claims, 13 Drawing Sheets

(56) References Cited

U.S. PATENT DOCUMENTS

| | | | | |
|---|---|---|---|---|
| 2024/0406166 A1* | 12/2024 | Bell | ...................... | G06N 3/045 |
| 2024/0414048 A1* | 12/2024 | Kasap | .................... | G06N 3/045 |
| 2024/0414211 A1* | 12/2024 | Boyer | ................. | H04L 63/1425 |
| 2025/0111238 A1 | 4/2025 | Islam | | |

OTHER PUBLICATIONS

International Search Report and Written Opinion received for PCT Application No. PCT/US2024/034647, Dec. 13, 2024, 21 pages.
International Search Report and Written Opinion received for PCT Application No. PCT/US2024/019616, Jul. 11, 2024, 15 pages.
"Large language model", Retrieved from the URL: https://en.wikipedia.org/w/index.php?title=Largelanguage_model&oldid=1161462207, Jun. 22, 2023, 18 Pages.
"Parsing", Retrieved from the URL: https://en.wikipedia.org/w/index.php?title=Parsing&oldid=1153935128, May 9, 2023, 12 Pages.
Invitation to pay additional fees received for PCT Application No. PCT/US2024/034647, Oct. 22, 2024, 10 pages.
Tunstall, et al., "Natural Language Processing with Transformers, Revised Edition", Published in O'Reilly Media Incorporation, May 2022.
Vaswani, et al., "Attention Is All You Need", In Proceedings of 31st Conference on Neural Information Processing Systems, Dec. 4, 2017, 11 Pages.
Notice of Allowance mailed on Jun. 9, 2025, in U.S. Appl. No. 18/335,064 10 pages.
International Preliminary Report on Patentability (Chapter I) received for PCT Application No. PCT/US2024/019616, Oct. 9, 2025, 10 pages.
Notice of Allowance mailed on Sep. 22, 2025, in U.S. Appl. No. 18/335,064 07 pages.

* cited by examiner

Example Prompt for Generating Natural Language Descriptions of Log Lines

You are a Security Operations Center analyst, trying to understand security logs in different formats.

Task Description

Describe each of the below log lines in one sentence:

[BEGIN EXAMPLE LOG]

[{"ID":1, "Log": "Jun 15 02:04:59 combo sshd(pam_unix)[20882]: authentication failure; logname= uid=0 euid=0 tty=NODEVssh ruser= rhost=221-135-151-1.hi-ip.hinet.net  user=root"}]

[END EXAMPLE LOG]

[BEGIN EXAMPLE DESCRIPTION]

[{"ID":1, "NL": "The root user failed to authenticate successfully from the IP address 221-135-151-1.hi-ip.hinet.net."}]

[END EXAMPLE DESCRIPTION]

⎫
⎬ 172
⎭

Following the process in the above example, study the below log and describe each line.

[BEGIN LOG]

{{LOG}}

[END LOG]

[BEGIN DESCRIPTION]

CONNECTING NATURAL AND SECURITY LANGUAGE IN THE EMBEDDING SPACE FOR BETTER THREAT HUNTING AND INCIDENT RESPONSE

BACKGROUND

A networked computing environment often has the ability to provide secure access to protected resources (e.g., networks, servers, storage devices, files, and computing applications) based on access rights that are tailored to particular users of the networked computing environment. An access control system often performs various functions for managing access to the protected resources including authentication, authorization, and auditing. Authentication refers to the process of verifying that credentials provided by a user are valid or to the process of confirming the identity associated with the user (e.g., confirming that a correct password has been entered for a given username). Authorization refers to the granting of a right or permission to access a protected resource or to the process of determining whether an authenticated user is authorized to access a protected resource. Auditing refers to the process of storing records (e.g., event logs) for preserving evidence related to access control events. Event logs record various types of security related information, such as information associated with login sessions, file deletions, failed password attempts, and account lockouts.

BRIEF SUMMARY

Systems and methods for generating and deploying large language models that combine natural language with the language of security related data are provided. In some cases, the large language models are used by a question answering system for security data to generate automated responses. Given an input prompt (or a search query) from an end user of the question answering system, the question answering system identifies relevant content from the security data and performs a security risk mitigation action and/or displays a response based on the relevant content. The question answering system allows the end user of the question answering system to query security logs using natural language text without requiring the end user to provide a structured query and without requiring the security data be parsed and ingested into a database system.

According to some embodiments, the technical benefits of the systems and methods disclosed herein include reduced energy consumption, reduced cost of computing and storage resources, and improved system performance. Other technical benefits can also be realized through implementations of the disclosed technologies.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Like-numbered elements refer to common components in the different figures.

FIG. 1C depicts an example prompt for generating natural language descriptions of log lines.

DETAILED DESCRIPTION

Figure 1A:
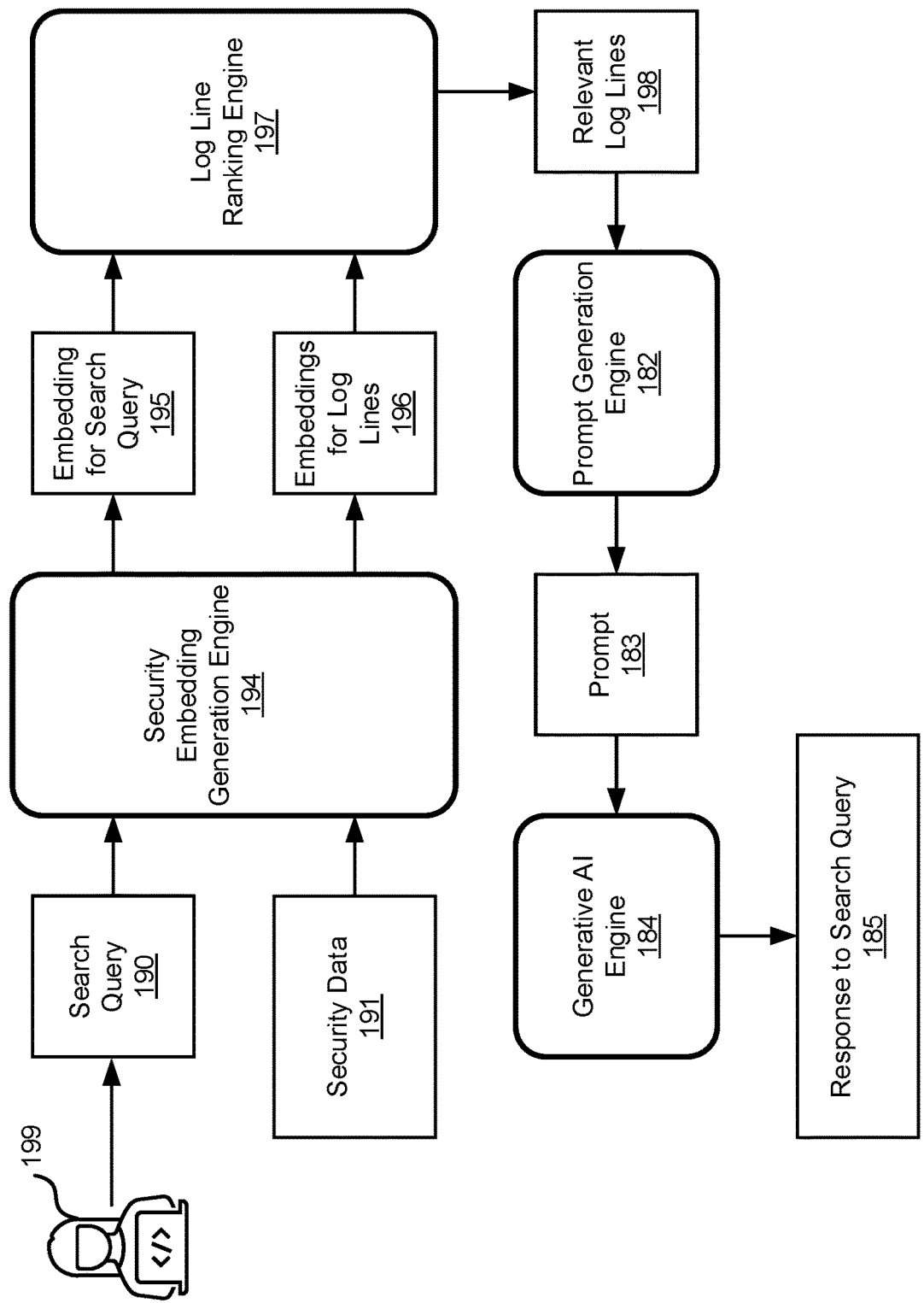
FIG. 1A depicts one embodiment of software-level components for deploying a security embedding generation LLM to generate a response to a search query for security related information contained within security data.

The technologies described herein utilize large language models (LLMs) and generative artificial intelligence (AI) to improve the speed, quality, and relevance of automated responses provided by a question answering system for security data. In some embodiments, a question answering system generates and utilizes an LLM that is trained to combine the language of security data, such as the language found in security logs and alerts, with natural language. As examples, the security data includes security logs, alerts, threat intelligence documents, and unstructured natural language documents that include security related data. In some cases, given an input prompt (or a search query) from an end user of the question answering system, the question answering system identifies relevant content from the security data and displays a response based on the relevant content. The question answering system permits the end user of the question answering system to query security logs using natural language without requiring the end user to provide a structured query (or a structured form of searching) and without requiring the security data be parsed and ingested into a database system.

Cyber threat hunting typically requires an analysis of security related data found in security logs, alerts, and threat intelligence documents. In at least one example, the security related data (or threat intelligence) is collected, processed, and analyzed using a question answering system for security data to detect a threat actor's targets and attack behaviors. The attack behaviors comprise actions that could result in the theft, loss, or alteration of data without permission. The question answering system has the ability to provide a natural language interface for an end user (e.g., a security professional) to analyze and detect cyber threats. For example, the end user has the ability to query the question answering system to retrieve and provide a response to the queries of "find all failed login events last week," "find all login events for user [USER_ID]," or "display all logs where activity originates from the IP address: [IP_ADDRESS]."

One technical issue with searching security related datasets to detect cyber threats is that the security related datasets are typically very large and require a query language, such as SQL or KQL, to access information. In some cases, as not all security related data is provided in security documents with a structured data format, the ability to access the security related data using a search query won't be possible until the underlying data is arranged into a structured format. LLMs, such as generative models, can be used to understand unstructured data; however, generative models only accept a certain size of data as an input at a time, which limits their ability to reason over a large volume of data. In one example, a generative model has a limited context window of 32K tokens or is limited to 4K tokens per request, encompassing both the request (or prompt) and the response. This limited ability of generative models hinders their use by security professionals to detect and analyze cyber threats and incidents.

One technical benefit of training a security embedding generation LLM to combine the language of security related data with natural language is that the requirement of using a query language may be removed, which reduces the amount of time needed to detect and respond to security threats, vulnerabilities, and incidents, and reduces the cost of computing and storage resources as the security related data does not need to be arranged into a structured format or stored using a database. Moreover, as there is no need to query a database, all security data can be stored in a vector storage and be retrieved using embeddings, which eliminates the need for parsers for complex feature engineering or database table designs. A technical benefit of identifying a set of relevant log lines (e.g., based on embedding distances and a threshold prompt length) out of a very large number of log lines within security data (e.g., within a set of security documents) is that a generative model with a limited context window can be utilized to provide responses (e.g., search results and summaries). By identifying relevant log lines based on embedding distances generated using a security embedding generation LLM, such as the security embedding generation LLM 132 in FIG. 1B, a data security system, such as the data security system 120 in FIG. 2C, may have the ability to utilize a generative model with a limited context window to provide a response and perform security risk mitigation actions based on the response, thereby improving data security system performance and reducing the amount of time to perform security risk mitigation actions.

In some embodiments, a data security system that incorporates question answering functionality utilizes an end user's query to match and retrieve relevant security data contained within security documents to be used within a generative model's prompt. The relevant security data is identified subject to a token limit for the generative model's prompt or is identified using a security embedding generation LLM that merges the embedding spaces of natural language text with security related data.

In some cases, the embeddings are generated using a Bidirectional Encoder Representations from Transformers (BERT) network or a Sentence-BERT approach that utilizes Siamese and triplet network structures to derive semantically meaningful sentence embeddings that can be compared using cosine similarity.

The technologies described herein also utilize security specific large language models (LLMs) to improve the performance and energy efficiency of machine learning systems that generate security related information and detect security related anomalies and events (e.g., detecting that a file has been deleted by a threat actor or that an incorrect password has been submitted more than a threshold number of times to access an account). In some embodiments, a security specific LLM is pretrained, fine-tuned, and deployed to generate and output semantically related security information. The security specific LLM is pretrained using a security specific dataset that incorporates long line handling and similarity deduplication (e.g., removing log files or lines from the security specific dataset based on cosine similarity between other log files or lines within the security specific dataset). The security specific LLM is pretrained with security specific objectives, such as next log line prediction based on host, system, application, and cyber attackers' behavior, in addition to masked token prediction. Further, a security specific similarity dataset is generated to align the security specific LLM to capture similarity between different cyber security events such as failed logins, password changes, failed authentication requests, and file deletions. The security specific LLM is fine-tuned using the security specific similarity dataset and then stored within a datastore or persistent storage. In one example, the fine-tuned version of the security specific LLM is deployed to generate security related information that is used to enable scenarios such as search and retrieval of event log lines, clustering of similar security events into buckets, and prompt generation for generative AI models.

A technical issue with utilizing a generic LLM that was trained with corpus data comprising natural language text data (e.g., from websites) for identifying semantically related security information is that the language used within cybersecurity logs, alerts, and threat intelligence documents is different from natural language. For example, in natural language the building blocks of language include "words", "idioms" and "sentences", whereas in cybersecurity, the building blocks include "log entries", "alerts" and "threat intelligence" data. One technical benefit of training a security specific LLM with security specific objectives and security specific datasets is that the semantic meaning of tokens in security logs, alerts, and threat intelligence documents has the ability to be more accurately captured by the security specific LLM, which improves the performance of the security specific LLM when generating completions that provide security related information for anomaly detection, search, and other security related applications.

In some embodiments, a security specific dataset is generated from a set of security documents, such as security logs, alerts, and threat intelligence documents. The set of security documents comprises electronic documents that store structured data and/or unstructured data related to security events. A security log includes records of security events, such as login/logout activity, including associated time stamps, locations, usernames, IP addresses, and computer names for each security event. As examples, a security log includes log lines that record security policy violations, file deletions, successful and unsuccessful login attempts, authentication successes and failures, changes in user privileges, and software installations and deletions. The security alerts include records of system and application errors and alerts. The threat intelligence documents include records of threat intelligence feeds.

Log lines within the security specific dataset that are redundant (e.g., two log lines that are exact matches with each other) or that have a degree of similarity (e.g., have a cosine similarity score above 0.5 or other threshold value) may be removed from the security specific dataset prior to pretraining the security specific LLM. In one example, log lines that are longer than a threshold length (e.g., longer than 512 tokens or 1024 character strings) are divided into multiple lines with each line less than the threshold length. In another example, a log line that is longer than a threshold number of tokens is partitioned into equal-sized lines with lengths less than the threshold number of tokens. In another example, a moving window approach with overlaps is used in which a log line of 1024 tokens is partitioned into three lines of length 512 tokens; a first line comprises the first 512 tokens of the log line, a second line comprises the tokens between the 256th token and the 768th token of the log line, and a third line comprises the last 512 tokens of the log line. In this case, the window size comprises 512 tokens. In one example, the three lines replace the original log line of 1024 tokens within security data that included the log line. Technical benefits of adjusting a window size applied to log lines within security logs during generation of a security specific dataset for training a security specific LLM include reduced energy consumption and reduced cost of computing and storage resources during generation of the security specific LLM.

In some embodiments, each log line in a security log is mapped to a particular event ID associated with a type of security event (e.g., a login activity to a particular machine). The particular event ID is used to map each log line to a particular type of security event. In some cases, the window size for partitioning log lines that are longer than a threshold number of tokens (e.g., log lines that are more than 1024 tokens) or that are longer than a threshold number of character sequences are adjusted based on the particular event ID for a log line. In one example, the window size is set to 1024 tokens if the particular event ID for a log line corresponds with a login/logout activity and is set to 512 tokens if the log line corresponds with an authentication failure.

The security specific dataset may be used to pretrain a security specific LLM with security specific objectives, such as next log line prediction given a particular host, system, application, or type of cyber attacker. A cyber attack comprises a set of actions performed by a threat actor to gain unauthorized access to computing resources. Some examples of types of cyber attacks include phishing attacks, denial-of-service attacks, brute-force attacks, and malware attacks.

Subsequently, the security specific LLM is fine-tuned using a security specific similarity dataset. The security specific similarity dataset includes positive log line pairs and negative log line pairs. In some cases, each log line is assigned an event ID and two log lines with the same event ID are grouped together as a positive pair. In cases where an event ID cannot be extracted from a log line, then a template parser is used to identify an event ID for each log line.

In one embodiment, a security specific LLM is deployed to generate search results for a knowledge base of security logs. The security specific LLM is used to create embedding representations for each of the documents in the knowledge base. Given a query from a search user for security related information from the security logs, the query is converted into an embedding using the security specific LLM and then compared with the embedding representations for each of the documents in the knowledge base to identify and rank a set of relevant documents.

FIG. 1A depicts one embodiment of software-level components for deploying a security embedding generation LLM to generate a response to a search query for security related information contained within security data (e.g., security data stored within one or more security documents). The software-level components include security embedding generation engine 194, log line ranking engine 197, prompt generation engine 182, and generative AI engine 184. In one example, the software-level components are implemented or executed using a security system, such as the data security system 120 in FIG. 2C. As depicted, an end user 199 provides a search query 190 (e.g., comprising a natural language text query) that is input to the security embedding generation engine 194 to generate an embedding 195 for the search query. The security embedding generation engine 194 uses a security embedding generation LLM to generate the embedding 195 for the search query. The security embedding generation LLM has been trained to combine the language of security data, such as the language found in security logs and alerts, with natural language text. In response to submission of the search query 190, security data 191 is identified. In one example, the end user 199 specifies a set of security documents storing the security data along with providing the search query 190. In another example, the security data 191 comprises all security logs and alerts generated within a past threshold period of time (e.g., within the past 24 hours).

In some cases, if the security data 191 comprises 10 million log lines, then the security embedding generation engine 194 generates 10 million embeddings 196 corresponding with the 10 million log lines, which are compared with the embedding 195 for the search query.

The log line ranking engine 197 compares the embedding 195 for the search query with each of the embeddings 196 for the log lines to determine a degree of similarity. The log line ranking engine 197 computes embedding distances between the embedding 195 for the search query and each of the embeddings 196 for the log lines. In one example, if the number of log lines from the security data 191 comprises 10 million log lines, then the log line ranking engine 197 computes 10 million embedding distances. As examples, the embedding distances comprise cosine distances or Euclidian distances. Given a threshold number of log lines for an input prompt or a threshold prompt length (e.g., a maximum number of tokens for a prompt), the log line ranking engine 197, ranks and sorts the embedding distances and then outputs a set of relevant log lines 198 comprising not more than the threshold number of log lines with the lowest embedding distances. The log line ranking engine 197 outputs a set of relevant log lines 198 that correspond with the best matching log lines within security data 191 to the search query, such that the number relevant log lines 198 satisfy the threshold prompt length.

The prompt generation engine 182 generates a prompt 183 comprising the set of relevant log lines 198 combined with the search query 190. The prompt 183 is used by the generative AI engine 184 to generate a response to the search query 185. The response to the search query 185 is displayed or stored using a data storage device.

Figure 1B:
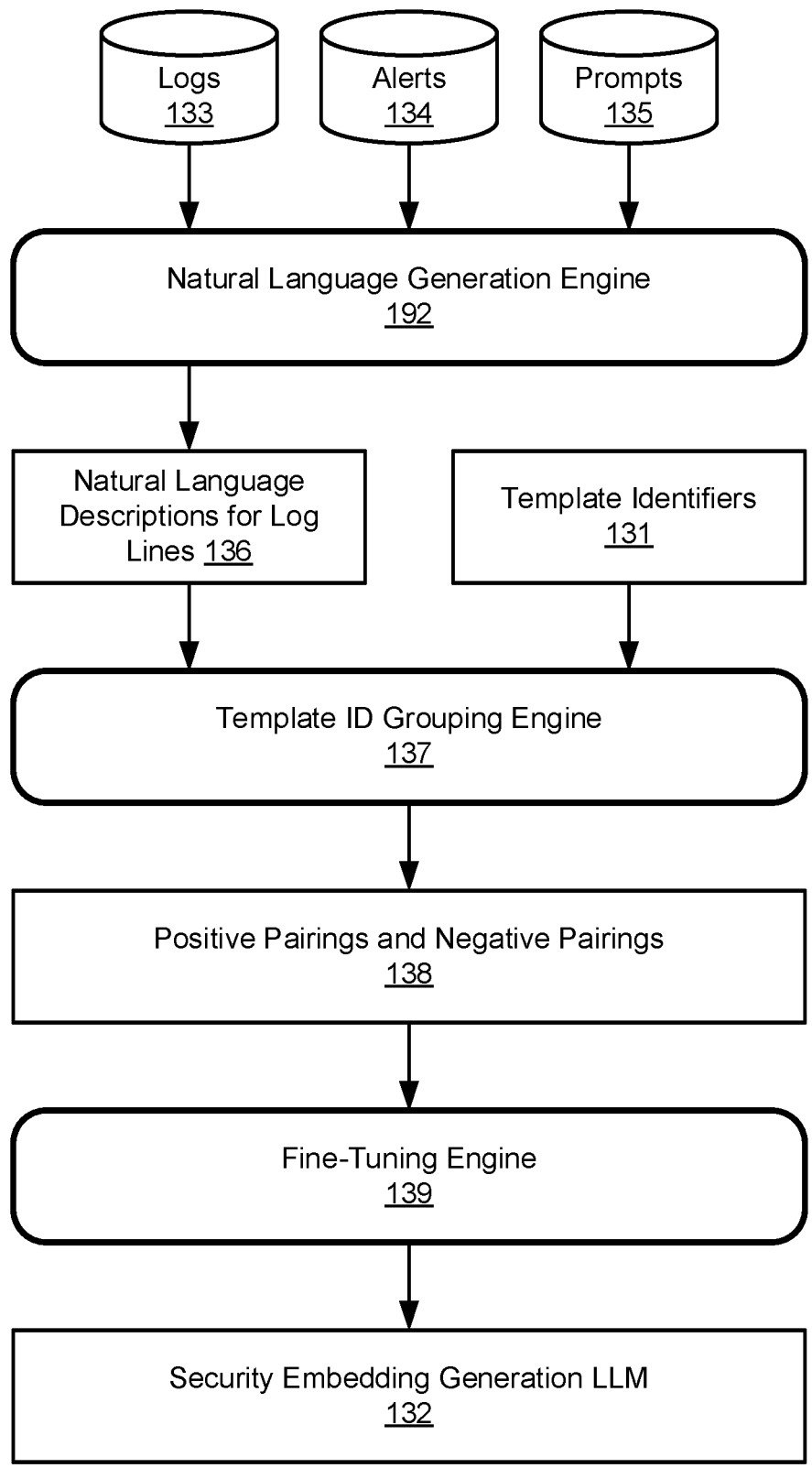
FIG. 1B depicts one embodiment of software-level components for generating a security embedding generation LLM that generates embedding representations for search queries and natural language text.

FIG. 1B depicts one embodiment of software-level components for generating a security embedding generation LLM that generates embedding representations for search queries and natural language text. The software-level components include natural language generation engine 192, template identifier (ID) grouping engine 137, and fine-tuning engine 139. In some cases, the software-level components are implemented or executed using a data security system, such as the data security system 120 in FIG. 2C. The natural language generation engine 192 generates natural language descriptions for log lines within the security logs 133 and the security alerts 134 given one or more input prompts 135. The security logs 133 and the security alerts 134 comprise security data. In one embodiment, the natural language generation engine 192 determines a first prompt (e.g., "describe each of the below log lines in one sentence") and generates a plurality of natural language descriptions 136 for each log line within the security data using the first prompt.

FIG. 1C depicts an example prompt for generating natural language descriptions of log lines. As depicted in FIG. 1C, the prompt includes a text section 172 that provides examples of log lines and natural language descriptions and a text section 174 specifying a format for providing the natural language descriptions.

Referring back to FIG. 1B, a set of template identifiers 131 are used to group similar log lines in terms of semantic and syntactic meaning. The template ID grouping engine 137 groups log lines within the security data and their corresponding natural language descriptions that are closely related or similar in terms of semantic and syntactic meaning. The template ID grouping engine 137 generates positive pairings and negative pairings 138 based on the groupings of similar log lines. In one example, a positive pairing corresponds with two log lines that have similar semantic and syntactic meaning and a negative pairing corresponds with two log lines that do not have similar semantic and syntactic meaning. The positive pairings and negative pairings 138 are used to train or fine-tune a security embedding generation LLM 132 such that the security embedding generation LLM 132 generates similar embeddings with at most a first embedding distance for the positive pairings and generates different embeddings with at least a second embedding distance greater than the first embedding distance for the negative pairings.

In another example, the positive pairings include a first pairing of the natural language descriptions corresponding with a first log line and a second log line, the negative pairings include a second pairing of the natural language descriptions corresponding with a third log line and a fourth log line, and the security embedding generation LLM 132 is fine-tuned such that the model generates similar embeddings with at most a first embedding distance given the first pairing and generates different embeddings with at least a second embedding distance greater than the first embedding distance given the second pairing.

In some embodiments, security data may include a plurality of log lines and for each log line(i) of the plurality of log lines, a generative model is used to generate a natural language description(i) for the log line(i) resulting in a <log line(i), natural language description(i)> pair. A positive pairing may comprise the pairing of a first pair <log line(x), natural language description(x)> and a second pair <log line(y), natural language description(y)> such that either <log line(x)> and <log line(y)> have similar syntax or <natural language description(x)> and <natural language description(y)> are similar or semantically equivalent. A negative pairing may comprise the pairing of a third pair <log line(w), natural language description(w)> and a fourth pair <log line(z), natural language description(z)> such that either <log line(w)> and <log line(z)> do not have similar syntax and <natural language description(w)> and <natural language description(z)> are not semantically equivalent. The security embedding generation LLM 132 is fine-tuned such that the model generates similar embeddings with at most a first embedding distance given the positive pairing and generates different embeddings with at least a second embedding distance greater than the first embedding distance given the negative pairing. In some cases, a sentence transformer is used to generate the embeddings that are compared (e.g., using cosine similarity) to identify sentences with similar meaning.

Figure 1D:
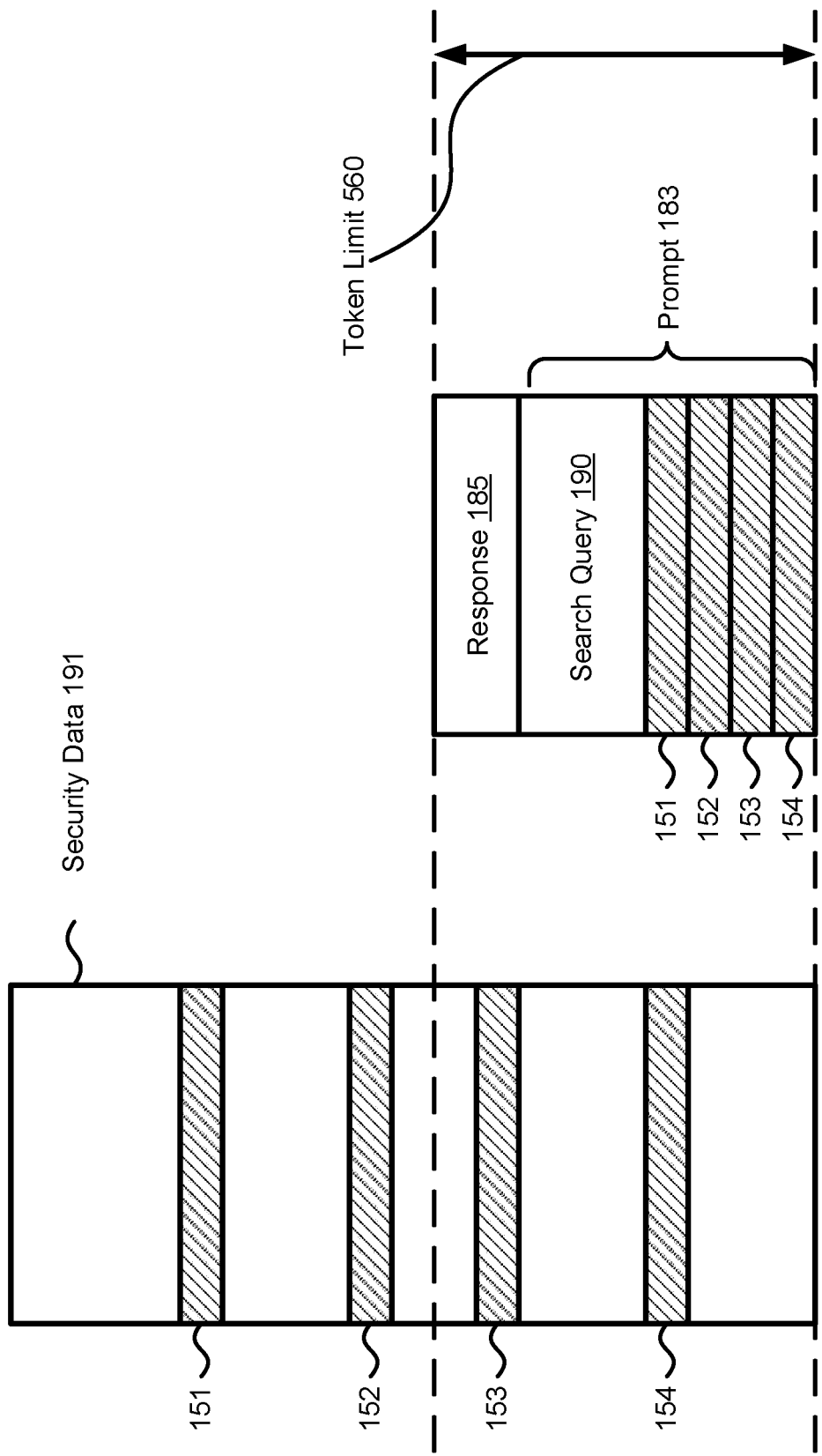
FIG. 1D depicts one embodiment of relevant security data and a prompt provided to a generational model to generate a response to a search query.

FIG. 1D depicts one embodiment of security data 191 including numerous log lines, such as log lines 151-154, and a prompt 183 provided to a generational model to generate a response 185 to a search query 190. In one example, the generational model may correspond with the generative AI engine 184 in FIG. 1A. As depicted, the security data has a size that is greater than a token limit 560. In one example, the security data 191 comprises 10 million log lines corresponding with 100 million tokens, and the token limit comprises 32K tokens. The relevant log lines 151-154 for the search query 190 are identified using a log line ranking engine, such as the log line ranking engine 197. The relevant log lines 151-154 are combined with the search query 190 to form a prompt 183 that is provided to the generational model to generate the response 185. The combined token size for the response 185 and the prompt 183 is less than the token limit.

Figure 1E:
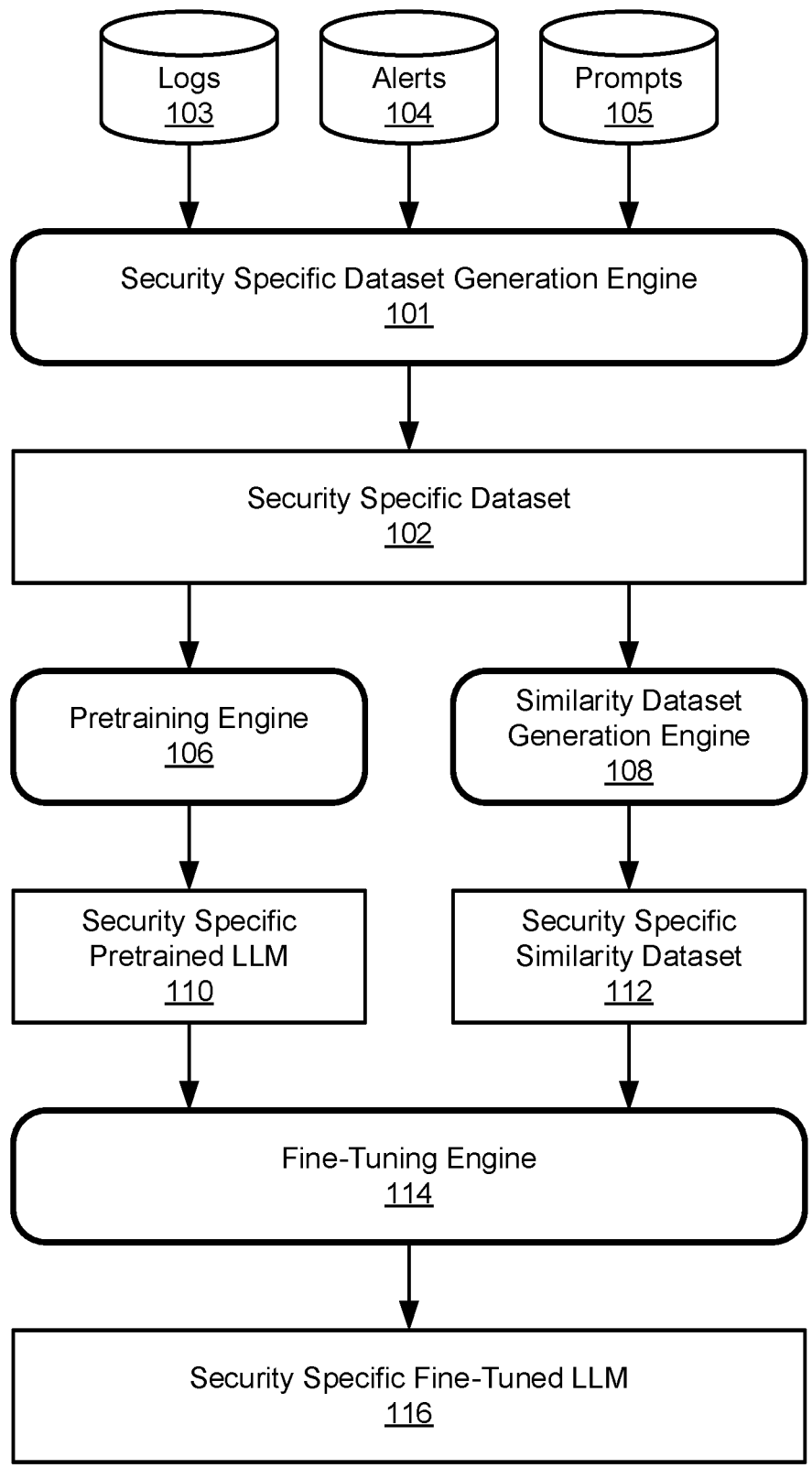
FIG. 1E depicts one embodiment of software-level components for generating a security specific LLM.

FIG. 1E depicts one embodiment of software-level components for generating a security specific LLM. The software-level components include a security specific dataset generation engine 101, pretraining engine 106, similarity dataset generation engine 108, and fine-tuning engine 114. In some cases, the software-level components are implemented or executed using a security system, such as the data security system 120 in FIG. 2C. Security data (e.g., including security logs 103, alerts 104, and threat intelligence (T.I.) documents 105) is used by the security specific dataset generation engine 101 to generate a security specific dataset 102. The security specific dataset 102 includes data related to security logs, alerts, events, incidents, threat intelligence information and other security related data. The security specific dataset 102 is stored in a datastore or a data storage layer.

In some cases, security data includes lots of repetition (e.g., numerous similar login activity for a particular user), which is detrimental for learning. Therefore, in some cases, a reduction or elimination of some of the duplicate information or duplicate log lines is performed based on one or more combinations of exact matches and fuzzy matches.

In one embodiment, the security specific dataset generation engine 101 removes documents and portions of documents (e.g., single lines, multiple lines, or paragraphs) from the security data to reduce duplication of content. In one example, the security specific dataset generation engine 101 removes log lines within the security specific dataset 102 that are redundant (e.g., log lines that are exact matches with each other) or that have a degree of similarity (e.g., have a cosine similarity score above 0.5) are removed from the security specific dataset 102. Cosine similarity comprises one metric for determining how similar two documents or two log lines are to each other. The specific dataset generation engine 101 also eliminate long lines by segmenting lines with lengths longer than a threshold length (e.g., that are longer than a threshold number tokens or longer than a threshold number of character strings) into two or more lines, such that each line is less than the threshold length.

In some cases, a moving window approach with overlaps is used in which a log line is partitioned into multiple lines of a fixed length (e.g., a fixed length of 512 tokens) and in which consecutive lines are offset by an amount less than the fixed length (e.g., offset by 256 tokens). In one example, a log line comprising 1024 tokens that exceeds a threshold number of tokens is partitioned into a first line with the first 512 tokens of the log line, a second line offset by 256 tokens that includes the 257th token through 768th token of the log line, and a third line with the last 512 tokens of the log line. A tokenizer is used to split a given raw input text into tokens by considering security specific details such as time variance.

In one example, tokenization is used to convert text or a sequence of characters into a sequence of tokens. For example, log lines comprising text are split into tokens, which comprise words, subwords (or character n-gram), characters, and punctuation symbols.

As security related data often involves long text portions, the long text portions are divided into multiple smaller text portions using a combination of different approaches including moving window, paragraph split or random split. Artificial intelligence can also be used to learn which parts of the text within the security data are more important to use, and which can be improved with user feedback.

The pretraining engine 106 generates the security specific pretrained LLM 110 using the security specific dataset 102 with security specific objectives, such as next log line prediction given log lines associated with a host, system, application, users, and/or a history of cyber attack behavior. In one example, a next log line is predicted given an input sequence of log lines associated with a particular user attempting to access a computer system and/or a number of unsuccessful login attempts by the particular user. The security specific pretrained LLM 110 is stored in a data storage layer or a persistence layer.

In one embodiment, an encoder style transformer architecture (e.g., an encoder only transformer architecture) is utilized to pretrain an LLM that learns the nuances among different tokens using self-supervised learning. This pretraining can include tasks such as predicting the next security event or predicting the next log line. The definition of a next security event can be scoped to different entities including but not limited to users, hosts, applications or attackers' behaviors.

The similarity dataset generation engine 108 generates a security specific similarity dataset 112 that includes positive pairs and negative pairs for facilitating contrastive learning. During fine-tuning of the security specific pretrained LLM 110, the fine-tuning engine 114 uses the positive pairs and negative pairs to generate an embedding space in which positive pairs are given similar embeddings that minimize embedding distance while negative pairs are pushed apart and are given different embeddings that maximize embedding distance.

The security specific similarity dataset 112 is generated by the similarity dataset generation engine 108 to enable fine-tuning of the security specific pretrained LLM 110 to create improved representations (or embeddings) of security related data. In some cases, event identifiers (or event IDs) are used to determine log line pairs. For example, with security logs, a log line pair can be determined by grouping similar log lines together if both log lines are determined to map to the same event ID or to the same type of security event. In some cases, an event ID is parsed directly from a log line (e.g., the event ID is embedded within the log line). In cases in which event IDs cannot be directly parsed from one or more log lines, then a generic parser is used to create unique templates for the one or more log lines, and then each unique template corresponds with a unique event ID. In some cases, a positive pair of log lines is identified if both log lines map to the same unique event ID and a negative pair of log lines is identified if both log lines do not map to the same unique event ID.

In some embodiments, positive pairs and the negative pairs are used to generate the security specific fine-tuned LLM 116 by fine-tuning the security specific pretrained LLM 110 such that positive pairings of similar cyber security events (e.g., failed logins and password changes) map to embeddings that are close to each other within some distance measure (e.g., within a threshold cosine similarity or Euclidian distance) and negative pairings map to embeddings that are far apart by more than the distance measure. The security specific fine-tuned LLM 116 is stored using a data storage layer or a persistence layer.

Figure 2A:
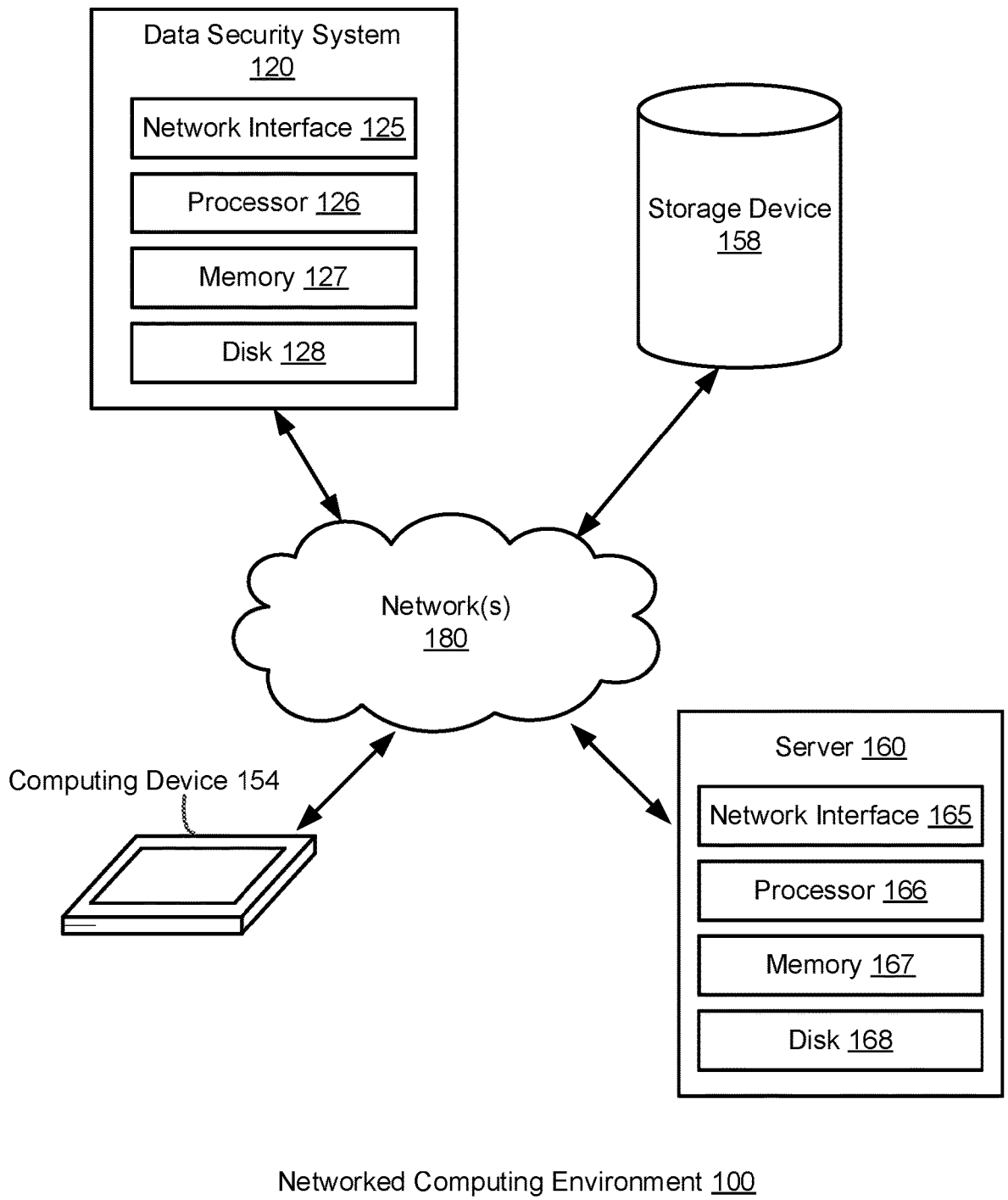
FIG. 2A depicts one embodiment of a networked computing environment.

FIG. 2A depicts one embodiment of a networked computing environment 100 in which the disclosed technology is practiced. The networked computing environment 100 includes a data security system 120, storage device 158, server 160, and a computing device 154 in communication with each other via one or more networks 180. The networked computing environment 100 includes various computing and storage devices interconnected through one or more networks 180. In some cases, the networked computing environment 100 corresponds with or provide access to a cloud computing environment providing Software-as-a-Service (SaaS) or Infrastructure-as-a-Service (IaaS) services. The one or more networks 180 allow computing devices and/or storage devices to connect to and communicate with other computing devices and/or other storage devices. In some cases, the networked computing environment 100 includes other computing devices and/or other storage devices not shown. The other computing devices include, for example, a mobile computing device, a non-mobile computing device, a server, a workstation, a laptop computer, a tablet computer, a desktop computer, or an information processing system. The other storage devices include, for example, a storage area network storage device, a networked-attached storage device, a hard disk drive, a solid-state drive, a data storage system, or a cloud-based data storage system. The one or more networks 180 can include a cellular network, a mobile network, a wireless network, a wired network, a secure network such as an enterprise private network, an unsecure network such as a wireless open network, a local area network (LAN), a wide area network (WAN), the Internet, or a combination of networks.

In some embodiments, the computing devices within the networked computing environment 100 comprise real hardware computing devices or virtual computing devices, such as one or more virtual machines. The storage devices within the networked computing environment 100 comprise real hardware storage devices or virtual storage devices, such as one or more virtual disks. In one example, the real hardware storage devices include non-volatile and/or volatile storage devices.

The data security system 120 comprises a computing system or environment for generating security specific LLMs and detecting security related anomalies using the security specific LLMs. As depicted in FIG. 2A, the data security system 120 includes a network interface 125, processor 126, memory 127, and disk 128 all in communication with each other. The network interface 125, processor 126, memory 127, and disk 128 comprise real components or virtualized components. In one example, the network interface 125, processor 126, memory 127, and disk 128 are provided by a virtualized infrastructure or a cloud-based infrastructure. Network interface 125 allows the database system 120 to connect to one or more networks 180. Network interface 125 includes a wireless network interface and/or a wired network interface. Processor 126 allows the database system 120 to execute computer readable instructions stored in memory 127 in order to perform processes described herein. Processor 126 includes one or more processing units, such as one or more CPUs, one or more GPUs, and/or one or more NPUs. Memory 127 comprises one or more types of memory (e.g., RAM, SRAM, DRAM, EEPROM, Flash, etc.). Disk 128 includes a hard disk drive and/or a solid-state drive. In one example, memory 127 and disk 128 comprise hardware storage devices.

The computing device 154 comprises a mobile computing device, such as a tablet computer, that allows a user to access a graphical user interface for the data security system 120. In one example, a user interface is provided by the data security system 120 and displayed using a display screen of the computing device 154.

A server, such as server 160, allows a client device, such as the data security system 120 or computing device 154, to download information or files (e.g., executable, text, application, audio, image, or video files) from the server. The server 160 comprises a hardware server. In some cases, the server acts as an application server or a file server. The server 160 includes a network interface 165, processor 166, memory 167, and disk 168 all in communication with each other. Network interface 165 allows server 160 to connect to one or more networks 180. Network interface 165 includes a wireless network interface and/or a wired network interface. Processor 166 allows server 160 to execute computer readable instructions stored in memory 167 in order to perform processes described herein. Processor 166 includes one or more processing units, such as one or more CPUs, one or more GPUs, and/or one or more NPUs. Memory 167 comprises one or more types of memory (e.g., RAM, SRAM, DRAM, EEPROM, Flash, etc.). Disk 168 includes a hard disk drive and/or a solid-state drive. In some cases, the disk 168 includes a flash-based SSD or a hybrid HDD/SSD drive. In one example, memory 167 and disk 168 comprise hardware storage devices.

The networked computing environment 100 has the ability to provide a cloud computing environment for one or more computing devices. In one embodiment, the networked computing environment 100 includes a virtualized infrastructure that provides software, data processing, and/or data storage services to end users accessing the services via the networked computing environment. In one example, networked computing environment 100 provides cloud-based applications to computing devices, such as computing device 154, using the data security system 120.

Figure 2B:
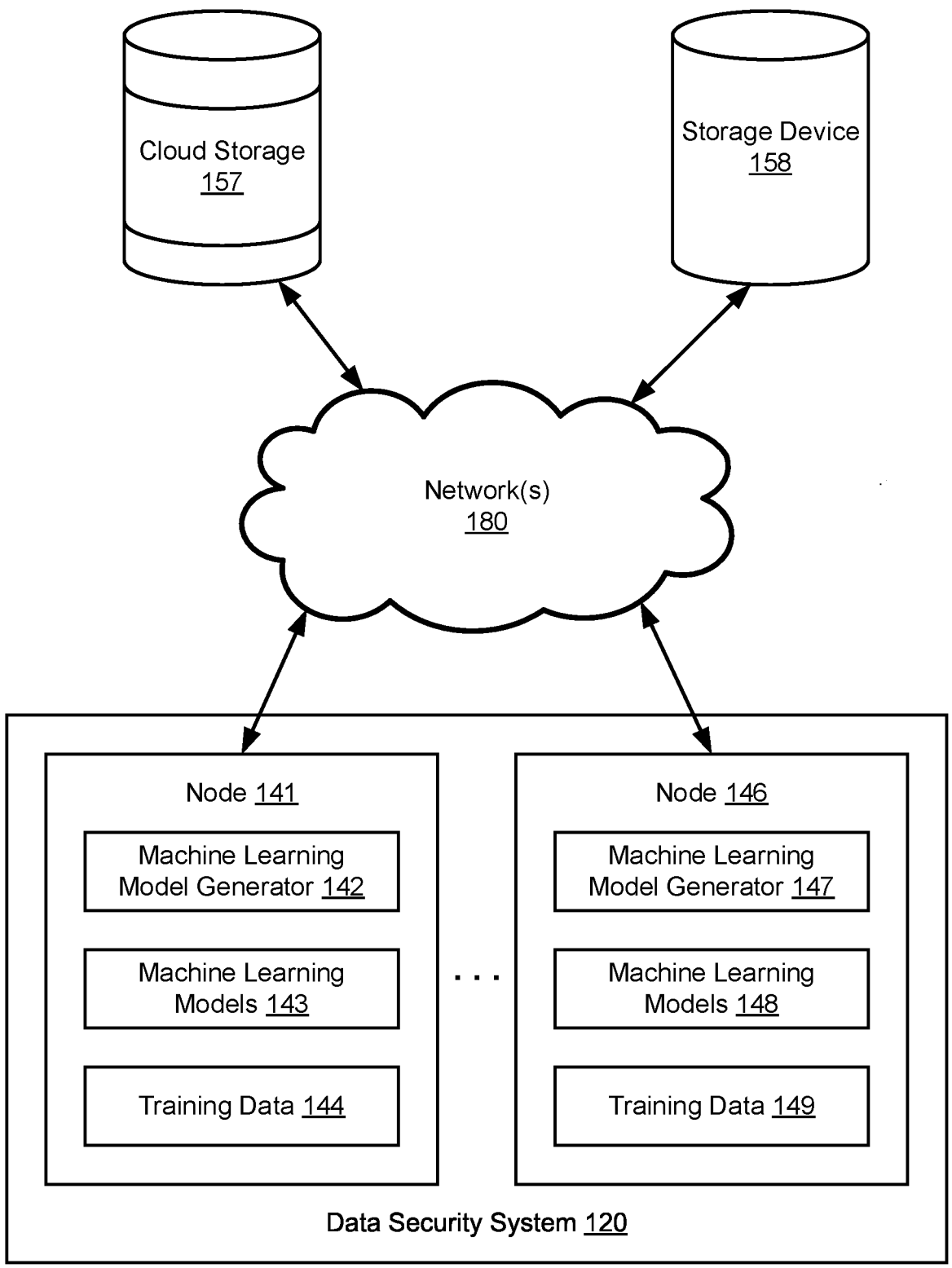
FIG. 2B depicts one embodiment of a data security system.

FIG. 2B depicts one embodiment of the data security system 120 including nodes 141 and 146 in communication with cloud data storage 157 and data storage device 158 via one or more networks 180. The nodes 141 and 146 comprise two nodes out of multiple nodes that are networked together and present themselves as a distributed system. The cloud data storage 157 corresponds with a cloud-based storage (e.g., private or public cloud storage). Data storage device 158 comprises a hard disk drive (HDD), a magnetic tape drive, a solid-state drive (SSD), a storage area network (SAN) storage device, or a networked-attached storage (NAS) device. As depicted, node 141 includes a machine learning model generator 142, machine learning models 143, and training data 144. Node 146 includes a machine learning model generator 147, machine learning models 148, and training data 149. The machine learning models 143 includes one or more security specific LLMs.

Figure 2C:
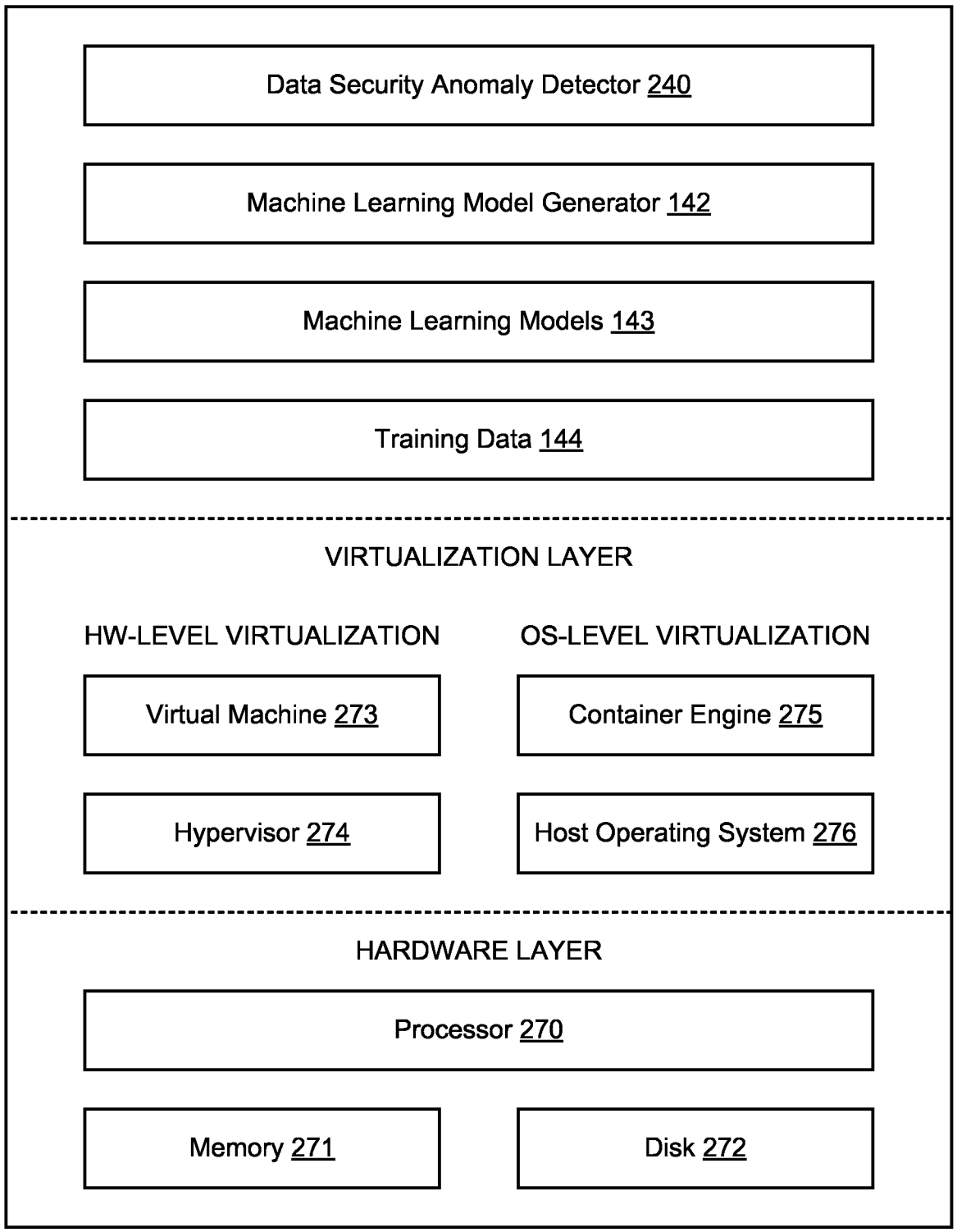
FIG. 2C depicts one embodiment of various components of a data security system.

FIG. 2C depicts one embodiment of various components of the data security system 120. As depicted, the data security system 120 includes hardware-level components and software-level components. The hardware-level components include one or more processors 270, one or more memories 271, and one or more disks 272. Both the one or more memories 271 and the one or more disks 272 comprise storage devices. The software-level components include software applications and computer programs. In some embodiments, the data security anomaly detector 240, machine learning model generator 142, machine learning models 143, and training data 144 are implemented using software or a combination of hardware and software.

In some cases, the software-level components run using a dedicated hardware server. In other cases, the software-level components run using a virtual machine or containerized environment running on a plurality of machines. In various embodiments, the software-level components run from the cloud (e.g., the software-level components are deployed using a cloud-based compute and storage infrastructure).

The machine learning models 143 comprise one or more machine learning models that are stored in a memory, such as memory 271. The one or more machine learning models are trained, executed, and/or deployed using one or more processors, such as processor 270. The one or more machine learning models include neural networks (e.g., deep neural networks), support vector machine models, decision tree-based models, k-nearest neighbor models, Bayesian networks, or other types of models such as linear models and/or non-linear models. In some cases, a linear model is specified as a linear combination of input features and a neural network comprises a feed-forward neural network, recurrent neural network, or a convolutional neural network. In some cases, the machine learning models 143 include one or more multimodal models. The machine learning models 143 include one or more language models, such as security specific LLMs.

As depicted in FIG. 2C, the software-level components also include virtualization layer processes, such as virtual machine 273, hypervisor 274, container engine 275, and host operating system 276. The hypervisor 274 comprises a native hypervisor (or bare-metal hypervisor) or a hosted hypervisor (or type 2 hypervisor). The hypervisor 274 provides a virtual operating platform for running one or more virtual machines, such as virtual machine 273. A hypervisor comprises software that creates and runs virtual machine instances. Virtual machine 273 include a plurality of virtual hardware devices, such as a virtual processor, a virtual memory, and a virtual disk. The virtual machine 273 includes a guest operating system that has the capability to run one or more software applications. The virtual machine 273 runs the host operation system 276 upon which the container engine 275 runs.

A container engine 275 runs on top of the host operating system 276 in order to run multiple isolated instances (or containers) on the same operating system kernel of the host operating system 276. Containers have the ability to facilitate virtualization at the operating system level and provide a virtualized environment for running applications and their dependencies. Containerized applications comprise applications that run within an isolated runtime environment (or container). The container engine 275 acquires a container image and convert the container image into running processes. In some cases, the container engine 275 groups containers that make up an application into logical units (or pods).

In some embodiments, the depicted components of the data security system 120 that includes the data security anomaly detector 240, machine learning model generator 142, machine learning models 143, and training data 144 are implemented in the cloud or in a virtualized environment that allows virtual hardware to be created and decoupled from the underlying physical hardware.

The data security system 120 utilizes the machine learning model generator 142 to generate or train a security specific LLM using the training data 144. The training data 144 includes portions of the security specific dataset 102 in FIG. 1E and portions of the security specific similar dataset 112 in FIG. 1E. The machine learning model generator 142 include training engines such as the security specific dataset generation engine 101 in FIG. 1E, the similarity dataset generation engine 108 in FIG. 1E, the pretraining engine 106 in FIG. 1E, and the fine-tuning engine 114 in FIG. 1E.

The data security system 120 utilizes the machine learning model generator 142, machine learning models 143, and training data 144 to implement various machine learning algorithms, such as supervised machine learning algorithms. Supervised machine learning refers to machine learning methods where labeled training data is used to train or generate a machine learning model or set of mapping functions that maps input feature vectors to output predicted answers. The trained machine learning model is then be deployed to map new input feature vectors to predicted answers. Supervised machine learning can be used to solve regression and classification problems. A regression problem is where the output predicted answer comprises a numerical value. Regression algorithms include linear regression, polynomial regression, and logistic regression algorithms. A classification problem is where the output predicted answer comprises a label (or an identification of a particular class). Classification algorithms include support vector machine, decision tree, k-nearest neighbor, and random forest algorithms.

In some cases, a support vector machine algorithm determines a hyperplane (or decision boundary) that maximizes the distance between data points for two different classes. The hyperplane separates the data points for the two different classes and a margin between the hyperplane and a set of nearest data points (or support vectors) is determined to maximize the distance between the data points for the two different classes.

In some cases, a k-nearest neighbor algorithm determines a set of test data points and a set of training data points, identifies a distance function, calculates distances between a selected data point of the set of test data points to each of the set of training data points using the distance function, and then sorts the calculated distances to identify a subset of the set of training data points that are closest to the selected data point (e.g., the k-nearest neighbors to the selected data point). The distance function calculates a Euclidean distance, a Manhattan distance, or a Hamming distance. In at least one example, the k-nearest neighbor algorithm comprises an approximate k-nearest neighbor algorithm that utilizes navigable small world graphs with controllable hierarchy.

During a training phase, a machine learning model, such as one of the machine learning models 143, is trained to generate predicted answers using a set of labeled training data, such as training data 144. The training data 144 is stored in a memory, such as memory 271. In some cases, labeled data is split into a training data set and an evaluation data set prior to or during the training phase. The machine learning model generator 142 can implement a machine learning algorithm that uses a training data set from the training data 144 to train the machine learning model and uses the evaluation data set to evaluate the predictive ability of the trained machine learning model. The predictive performance of the trained machine learning model is determined by comparing predicted answers generated by the trained machine learning model with the target answers in the evaluation data set (or ground truth values). For a linear model, the machine learning algorithm determines a weight for each input feature to generate a trained machine learning model that can output a predicted answer. In some cases, the machine learning algorithm includes a loss function and an optimization technique. The loss function is used to quantify the penalty that is incurred when a predicted answer generated by the machine learning model does not equal the appropriate target answer. The optimization technique seeks to minimize the quantified loss. One example of an appropriate optimization technique is online stochastic gradient descent.

In some embodiments, the machine learning model generator 142 trains a machine learning model using one or more training or learning algorithms. In one example, the machine learning model generator 142 utilizes backwards propagation of errors (or backpropagation) to train a multilayer neural network. In some cases, the machine learning model generator 142 performs supervised training techniques using a set of labeled training data. In other cases, the machine learning model generator 142 performs unsupervised training techniques using a set of unlabeled training data. The machine learning model generator 142 also performs a number of generalization techniques to improve the generalization capability of the machine learning models being trained, such as weight-decay and dropout regularization.

In some embodiments, the training data 144 includes a set of training examples. In at least one example, each training example of the set of training examples includes an input-output pair, such as a pair comprising an input vector and a target answer (or supervisory signal). In another example, each training example of the set of training examples includes an input vector and a pair of outcomes corresponding with a first decision to perform a first action and a second decision to not perform the first action. In this case, each outcome of the pair of outcomes is scored and a positive label is applied to the higher scoring outcome while a negative label is applied to the lower scoring outcome.

The machine learning model generator 142 generated or trained one or more language models for facilitating natural language processing. Natural language processing (NLP) referred to the ability of a computing system to process and analyze natural language data to understand human language that is written or spoken. For example, NLP tasks have the ability to be utilized to classify portions of text (e.g., topic detection or detecting that an email is spam or that a sentence is grammatically correct) and to generate textual content (e.g., auto-completing a prompt with generated text or generating a textual summary for a large portion of text).

A large language model (LLM) refers to a language model that comprises a neural network with a large number of parameters (e.g., millions or billions of parameters or weights). In order to reduce training time and cost, transfer learning can be utilized in which a pre-trained model is used as a starting point for a specific task and then trained or fine-tuned with a supervised dataset for the specific task. In one example, an LLM is pre-trained using a large dataset and then fine-tuned using a much smaller dataset to tailor the LLM to solve a specific task. Pretraining refers to the act of training a machine learning model from scratch without any prior knowledge using a large corpus of data. Fine-tuning refers to a transfer learning process that modifies a pre-trained LLM by training the LLM in a supervised or semi-supervised manner. In some cases, the fine-tuning involves adapting a pretrained LLM for a specific task by fine-tuning the LLM using a task specific dataset.

In some cases, an LLM comprises a transformer model that is implemented using a transformer-based neural network architecture. A transformer model includes an encoder and/or a decoder. An encoder extracts features from an input sequence and a decoder uses the extracted features from the encoder to produce an output sequence. In some cases, an encoder comprises one or more encoding layers and a decoder comprises one or more decoding layers. Each encoding and decoding layer includes a self-attention mechanism that relates tokens within a sequence of tokens to other tokens within the sequence. In one example, the self-attention mechanism allows the transformer model to examine a word within a sentence and determine the relative importance of other words within the same sentence to the examined word. In some cases, an encoder includes a self-attention layer and a feed forward neural network layer and a decoder includes two self-attention layers and a feed forward neural network layer. In some cases, a transformer model (or transformer) utilizes an encoder-decoder architecture, an encoder only architecture, or a decoder only architecture.

One example of a transformer model is a Generative Pre-trained Transformer (GPT) model. A GPT model comprises a type of LLM that uses deep learning to generate human-like text. A GPT model is referred to as being "generative" because it generates new content based on a given input prompt (e.g., a text prompt), "pre-trained" because it is trained on a large corpus of data before being fine-tuned for specific tasks, and a "transformer" because it utilizes a transformer-based neural network architecture to process the input prompt to generate the output content (or response). Generative AI refers to unsupervised and/or semi-supervised machine learning algorithms that are used to generate new content, such as newly generated text, code, images, audio and video content.

In some embodiments, a machine learning model is trained to generate a language text response (or completion) given an inputted text prompt. The inputted text prompt provides information to help guide the machine learning model to generate an appropriate text response. Prompt engineering can be used to alter or update the inputted text prompt such that the machine learning model generates a more relevant text response. In some cases, the text response is generated by predicting the next set of words in a sequence of words provided by the inputted text prompt using a transformer model, such as a GPT language model. In some cases, the transformer model is trained using sets of input prompt-response pairs.

Multimodal learning refers to a type of machine learning in which a machine learning model is trained to understand multiple forms of input data (e.g., text, images, video, and audio data) that derive from different modalities. Image data can include different types of images, such as color images, depth images, and thermal images. In some cases, a machine learning model comprises a multimodal model, a language model, or a visual model.

Figure 3:
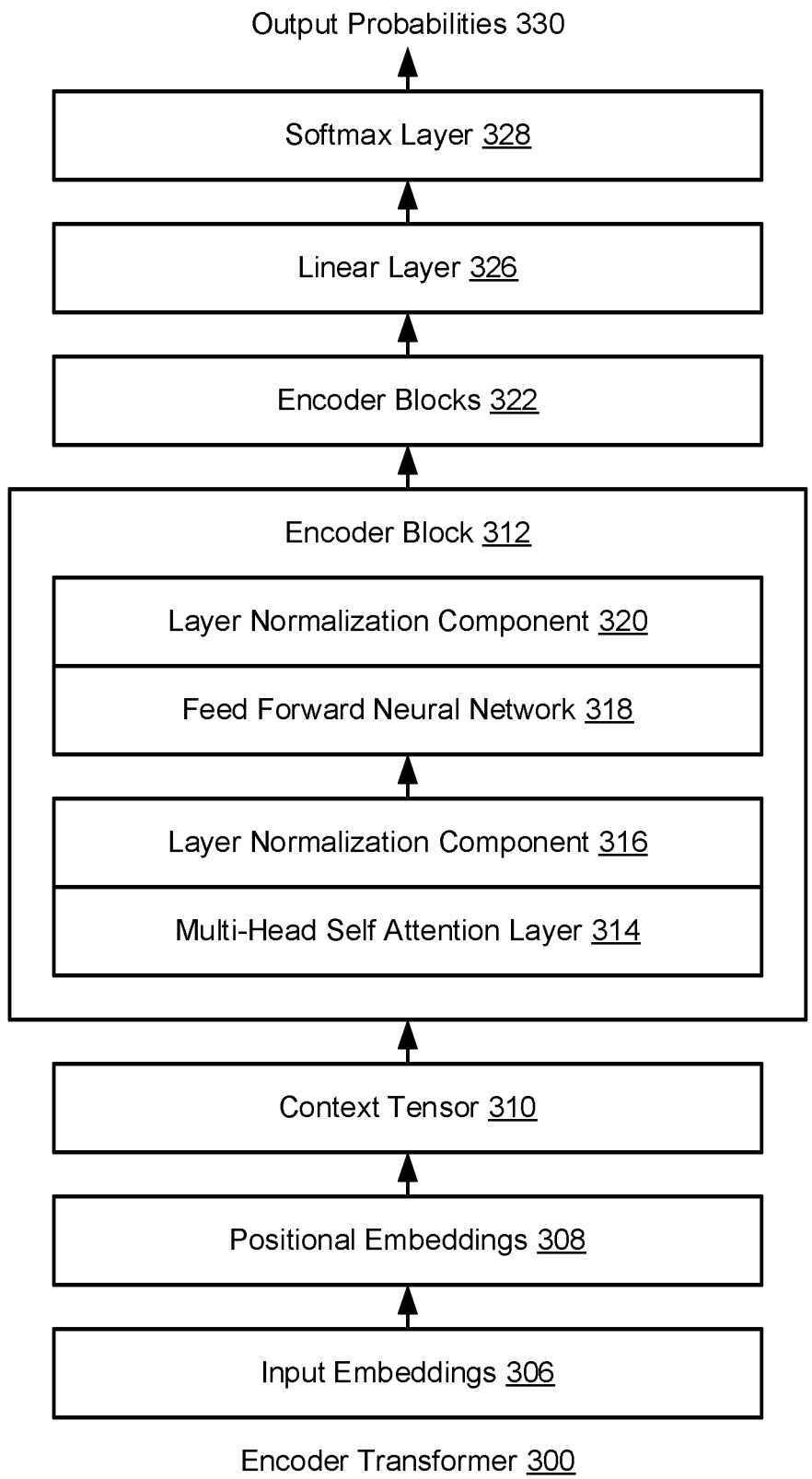
FIG. 3 depicts one embodiment of an encoder transformer.

FIG. 3 depicts one embodiment of an encoder transformer 300. The encoder transformer 300 comprises an example of a transform model or a machine learning model, such as one of the machine learning models 143 in FIG. 2C. The encoder transformer 300 includes input embeddings 306 of an input sequence and positional embeddings 308 that represent an order of the tokens in the input sequence. A tokenizer is used to transform the input sequence (e.g., from natural language text or from a security log) into a sequence of tokens which are encoded into the input embeddings 306. The positional embeddings 308 add position encoding vectors to the input embeddings 306. The input embeddings 306 and the positional embeddings 308 are combined to form a context tensor 310 that is provided to an encoder block 312. The encoder transformer 300 includes one or more encoder blocks, such as encoder block 312 and encoder blocks 322. Encoder blocks 322 comprises one or more encoder blocks.

As depicted in FIG. 3, the encoder block 312 includes a multi-head self-attention layer 314 followed by a layer normalization component 316 and a feed-forward neural network 318 followed by a layer normalization component 320. The context tensor 310 is input into the multi-head self-attention layer 314 of the encoder block 312 with a residual connection to layer normalization component 316. The output of the layer normalization component 316 is input to the feed forward neural network 318 with another residual connection to layer normalization component 320. The output of each encoder block comprises a set of hidden representations, which are input to additional encoder blocks, such as encoder blocks 322.

An attention mechanism is used to determine which parts of an input sequence are important or relevant for each token and should be weighted accordingly. The multi-head self-attention layer 314 takes as input the context tensor 310 and weigh the relevance of each token represented in the context tensor 310 to each other and generate corresponding attention weights for each token in the input embeddings 306.

In order to reduce training time, layer normalization components, such as layer normalization component 316, are used between various layers of the encoder transformer 300 or after each residual connection. The linear layer 326 comprises a fully-connected neural network that projects the scores output by the last encoder block in the encoder transformer 300. The softmax layer 328 applies the softmax function to compute a vector that represents the probability distribution of a list of output probabilities 330. In one example, the softmax function comprises a function that turns a vector of K real values into a vector of K real values that sum to 1.

Figure 4A:
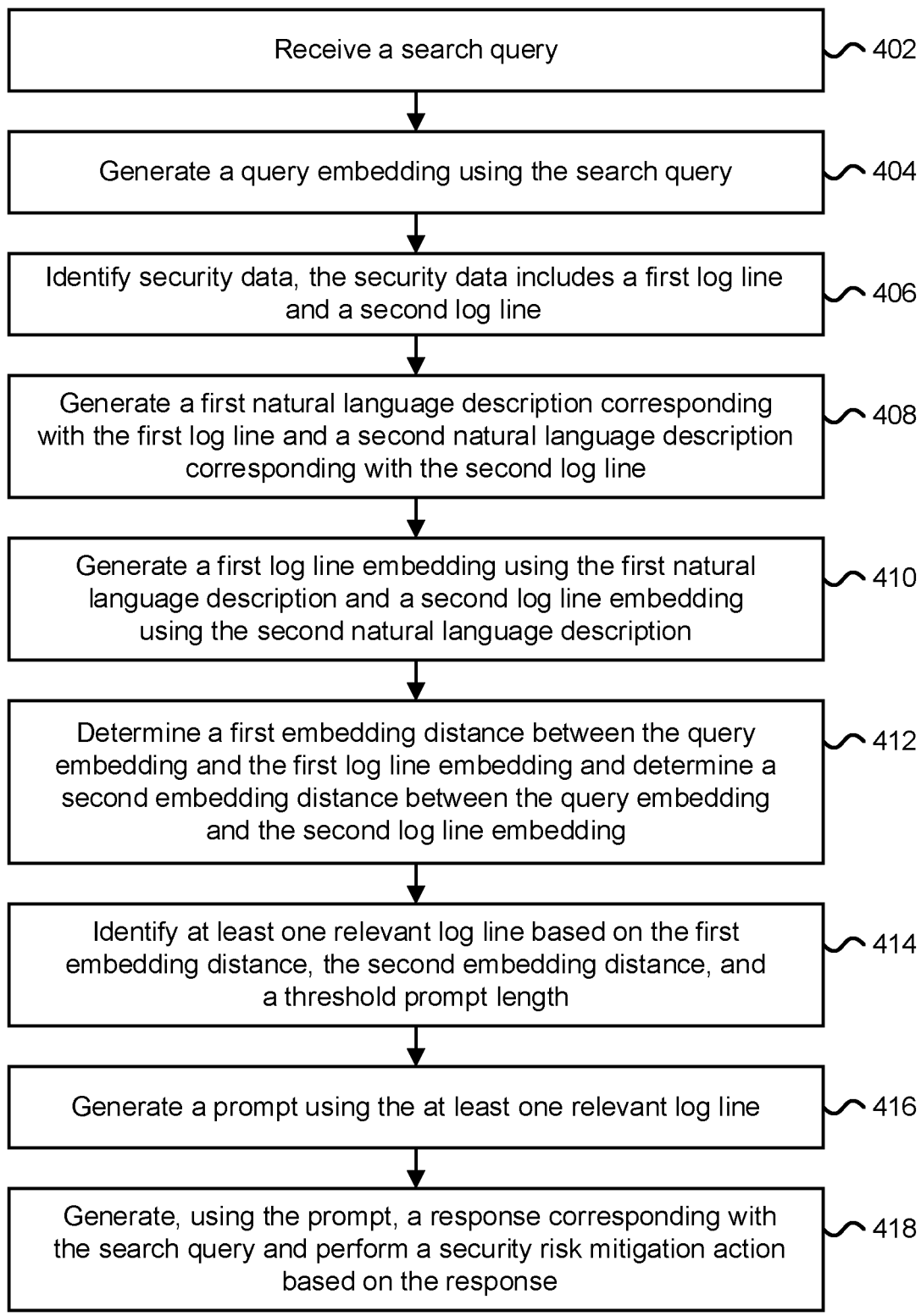
FIG. 4A depicts a flowchart describing one embodiment of a process for deploying a security embedding generation LLM.

FIG. 4A depicts a flowchart describing one embodiment of a process for deploying a security embedding generation LLM. In one embodiment, the process of FIG. 4A is performed by a data security system, such as the data security system 120 in FIG. 2C. In another embodiment, the process of FIG. 4A is implemented using a cloud-based computing platform or cloud-based computing services. In some cases, the security embedding generation LLM is deployed to generate and output a response to a search query for security related data or to perform a security risk mitigation action.

In step 402, a search query is received. The search query is provided by an end user of a data security system, such as the end user 199 in FIG. 1A. In step 404, a query embedding is generated using the search query. In one example, the query embedding is generated using a security embedding generation engine, such as the security embedding generation engine 194 in FIG. 1A. The security embedding generation engine generates embeddings using a security embedding generation LLM, such as the security embedding generation LLM 132 in FIG. 1B. In step 406, security data is identified (e.g., at least one security document that stored the security data is identified). The security data includes a first log line and a second log line. The security data is stored within a set of security documents that record a set of security events. The security data includes one or more security logs, alerts, and other electronic documents storing threat intelligence and security related information. As examples, the security data includes a security log that records various security events, file deletions, successful and unsuccessful login attempts, and authentication successes and failures. In some cases, the security data is identified based on the search query itself or identified using additional information provided by an end user of the data security system (e.g., the end user specifies a collection of security documents to be searched).

In step 408, a first natural language description corresponding with the first log line and a second natural language description corresponding with the second log line are generated. The natural language descriptions are generated using a natural language generation engine, such as the natural language generation engine 192 in FIG. 1A. In step 410, a first log line embedding is generated using the first natural language description and a second log line embedding is generated using the second natural language description. The first log line embedding is generated using a security embedding generation engine, such as the security embedding generation engine 194 in FIG. 1A. In step 412, a first embedding distance between the query embedding and the first log line embedding is determined and a second embedding distance between the query embedding and the second log line embedding is determined. In some cases, the embedding distance corresponds with a Euclidean distance, a cosine similarity distance, or a distance metric for measuring the proximity between two vectors in a vector space.

In some cases, each log line in the security data is mapped to a natural language description for the log line and then embeddings are generated for each log line using a security embedding generation LLM, such as the security embedding generation LLM 132 in FIG. 1B.

In step 414, at least one relevant log line is identified based on the first embedding distance, the second embedding distance, and a threshold prompt length. In one example, the threshold prompt length corresponds with a maximum number of tokens allocated to log lines for a prompt or corresponds with a maximum number of log lines that are used by an input prompt for a generative model. In some cases, the at least one relevant log line comprises a set of relevant log lines that correspond with the closest log line embeddings to the query embedding for the search query. In step 416, a prompt is generated using the at least one relevant log line. In step 418, a response corresponding with a search query is generated using the prompt and the generative model. In some cases, the response is outputted as displayed text or an electronic transmission. The response is stored using a data storage device or a data storage layer.

In some cases, a security risk mitigation action is performed by a data security system based on the response. In one embodiment, in response to detection that the response identifies that an unauthorized access to a computing system or electronic file has occurred, the data security system may change access rights to the computing system or electronic file. In one example, the change in access rights may prevent any user from accessing the computing system or electronic file until additional authentication procedures have been performed. In another embodiment, in response to detection that the response identifies a denial-of-service attack, the data security system may cause IP traffic from known or suspected malicious sources identified in response to be blocked or rate limited. In this case, the security risk mitigation action comprises blocking or reducing IP traffic from the sources identified in the response.

Figure 4B:
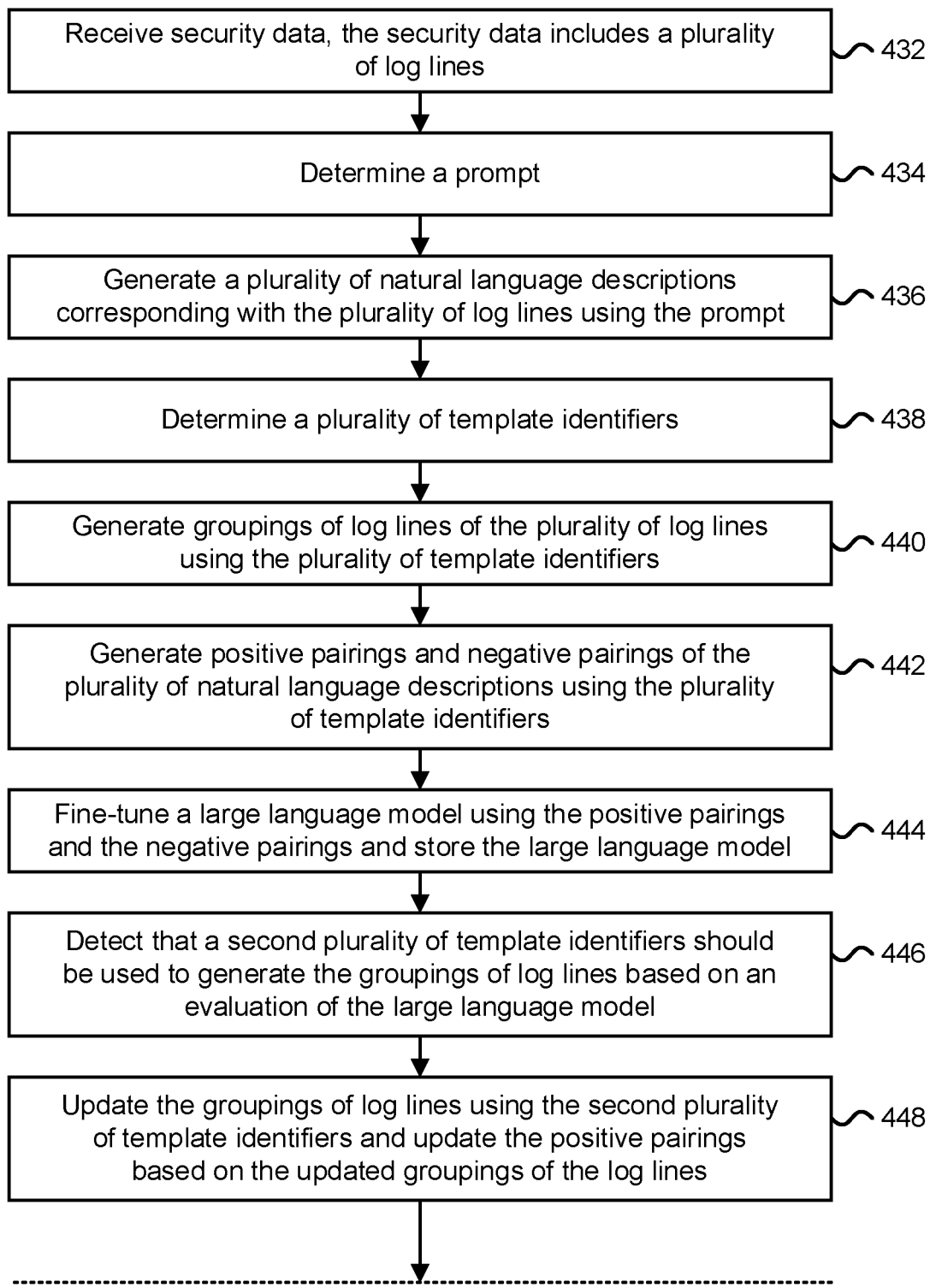
FIGS. 4B-4C depict a flowchart describing one embodiment of a process for generating a security embedding generation LLM that generates embeddings for security related data.
Figure 4C:
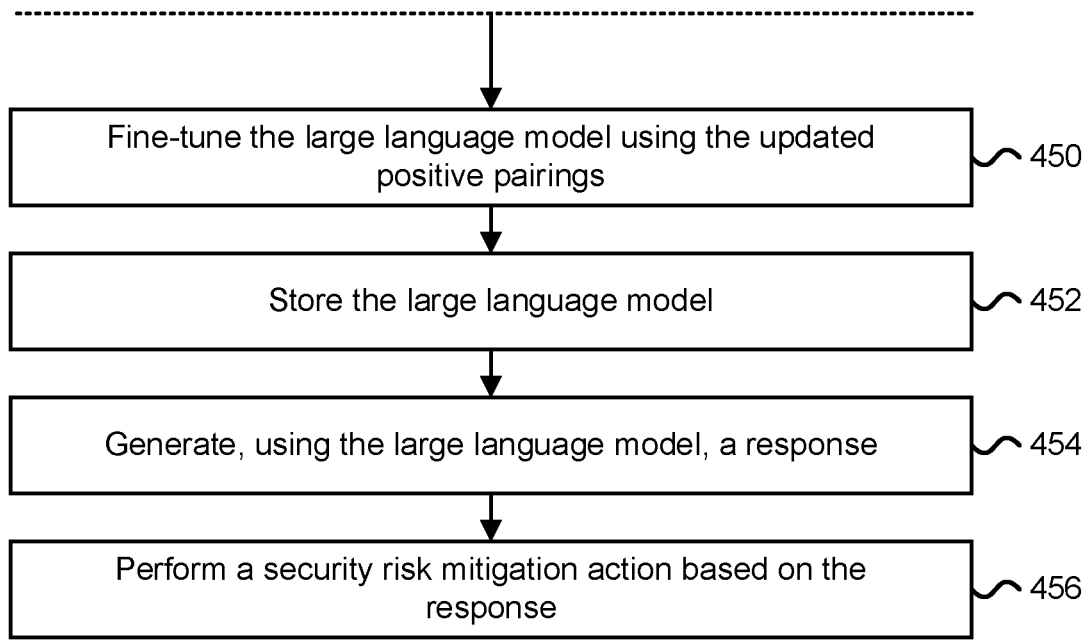

FIGS. 4B-4C depict a flowchart describing one embodiment of a process for generating a security embedding generation LLM that generates embeddings for security related data, such as log lines. In one embodiment, the process of FIGS. 4B-4C is performed by a data security system, such as the data security system 120 in FIG. 2C. In another embodiment, the process of FIGS. 4B-4C is implemented using a cloud-based computing platform or cloud-based computing services.

In step 432, security data is received (e.g., a security document is received). The security data includes a plurality of log lines. In step 434, a prompt is determined. The prompt comprises natural language text, such as "describe this log line" or "identify which attack technique is being used in this log line." In one embodiment, the prompt is determined based on a length of the security data or a type of security document storing the security data (e.g., a security alert or a security log file).

In step 436, a plurality of natural language descriptions corresponding with the plurality of log lines is generated using the prompt. The plurality of natural language descriptions is generated using a generative model. In one example, a Generative Pre-trained Transformer (GPT) model is used to generate the plurality of natural language descriptions. In one example, the prompt includes text such as "describe each log line using natural language." In another example, the prompt corresponds with the prompt depicted in FIG. 1C.

In step 438, a plurality of template identifiers is determined. Log lines within the security data are grouped based on the schema of the log lines themselves or based on the natural language descriptions for the log lines. Each template identifier of the plurality of template identifiers maps to a number of similar log lines. In some cases, positive pairs comprise <log line, natural language description> pairs that map to the same template identifier (or template ID) and negative pairs comprise <log line, natural language description> pairs that map to different template IDs. The plurality of template identifiers is used to cluster log lines that are similar in terms of semantic and/or syntactic meaning.

In one embodiment, a drain parser is used to create the plurality of template IDs. The drain parser identifies common elements in each log line such as a timestamp and username. In another embodiment, the plurality of template IDs is determined from natural language descriptions for log lines and grouping the natural language descriptions whose embeddings are within a particular embedding distance.

In step 440, groupings of log lines of the plurality of log lines are generated using the plurality of template identifiers. Each grouping of log lines correspond switch a unique template ID. In step 442, positive pairings and negative pairings of the plurality of natural language descriptions are generated using the plurality of template identifiers. In step 444, a large language model is fine-tuned using the positive pairings and the negative pairings. The large language model is stored using a data storage device. The large language model is fine-tuned with the objective of getting embeddings of positive pairs together (within a threshold embedding distance) and negative pairs far away from each other (with embedding distances greater than the threshold embedding distance). In one example, the large language model comprises a security specific fine-tuned LLM that is fine-tuned using the positive pairings and the negative pairings.

In step 446, it is detected that a second plurality of template identifiers should be used to generate the groupings of log lines based on an evaluation of the large language model. In one embodiment, in response to missing a particular type of security threat, a second plurality of template identifiers different from the plurality of template identifiers is used. In step 448, the groupings of log lines are updated using the second plurality of template identifiers and the positive pairings are updated based on the updated groupings of the log lines. In step 450, the large language model is fine-tuned using the updated positive pairings. In step 452, the updated large language model is stored, for example, stored using a data storage device.

In step 454, a response is generated using the large language model. In some embodiments, a data security system may identify a set of relevant log lines out of security data using embeddings generated using the large language model. The data security system may generate a prompt that includes the set of relevant log lines and utilize a generative model to generate the response using the prompt. The number of relevant log lines in the set of relevant log lines is limited based on a token limit for the generative model's prompt. In one example, the prompt comprises a concatenation of the set of relevant log lines (or corresponding natural language descriptions for the set of relevant long lines) with a search query used for identifying the set of relevant log lines.

In step 456, a security risk mitigation action is performed based on the response. In one embodiment, in response to detection that the response specifies that an unauthorized user has accessed a computing system or electronic file, the data security system may adjust access rights to the computing system or electronic file. In one example, the access rights may be adjusted to prevent the unauthorized user from accessing the computing system or electronic file until additional authentication procedures have been performed. In another embodiment, in response to detection that the response identifies a denial-of-service attack, the data security system may cause IP traffic from potentially malicious sources identified in response to be blocked or rate limited. In this case, the security risk mitigation action comprises blocking or reducing the rate of IP traffic from the sources identified in the response.

In some embodiments, given a user query (e.g., for identifying a cyber incident or threat), a data security system generates vector representations (or embeddings) for the user's query and associated logs lines within security data. Then, the most relevant log lines within the security data are identified by the data security system based on the similarity of the vector representations or the corresponding embedding distances. The most relevant log lines are filtered to a size that will fit into a generative model's prompt based on the token size limitation for the generative model. Given the user's query and the filtered set of relevant log lines, the generative model generates a response to the user's query.

Figure 4D:
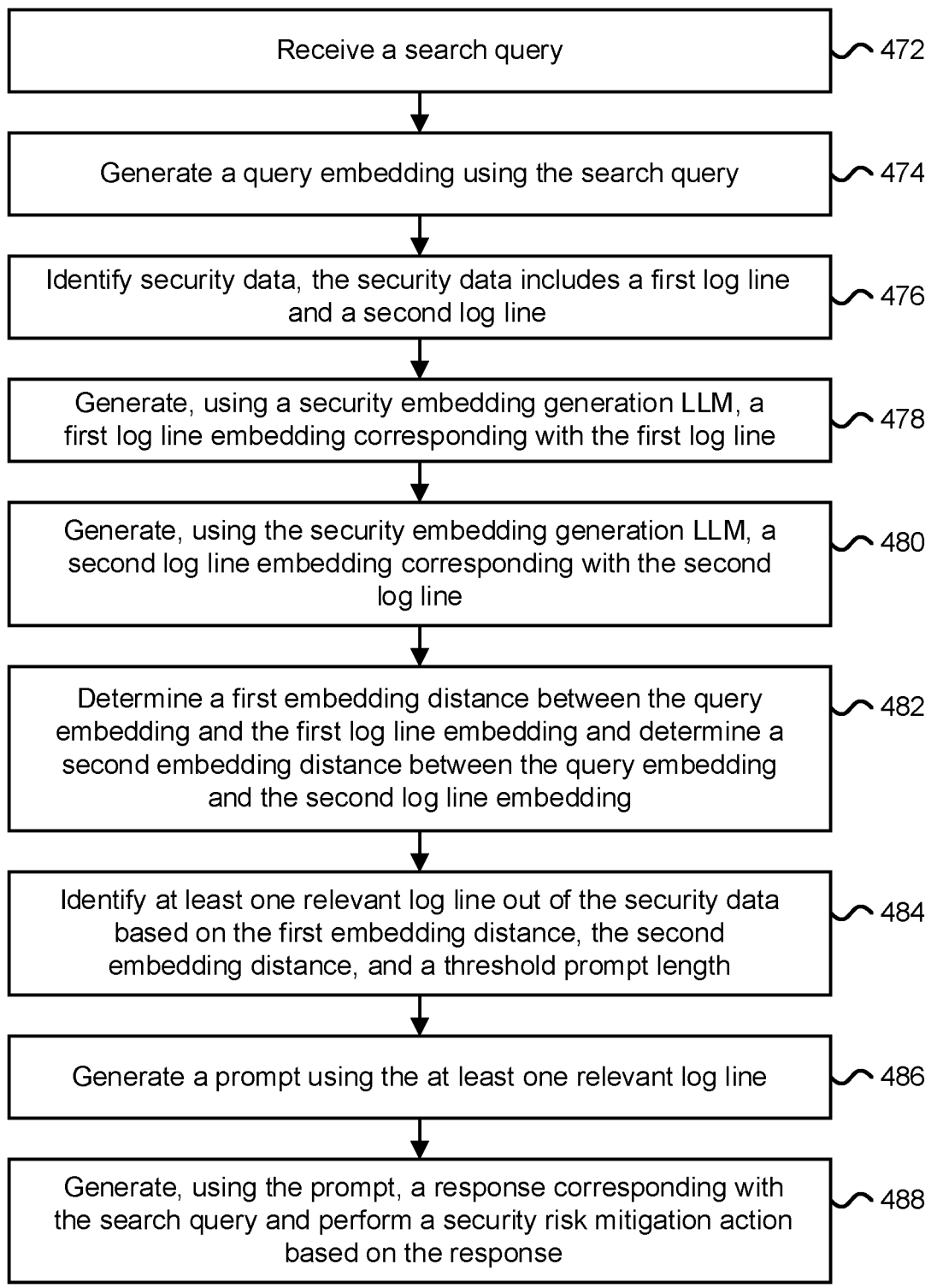
FIG. 4D depicts a flowchart describing another embodiment of a process for deploying a security embedding generation LLM.

FIG. 4D depicts a flowchart describing another embodiment of a process for deploying a security embedding generation LLM. In one embodiment, the process of FIG. 4D is performed by a data security system, such as the data security system 120 in FIG. 2C. In another embodiment, the process of FIG. 4D is implemented using a cloud-based computing platform or cloud-based computing services. In some cases, the security embedding generation LLM is deployed to generate and output a response to a search query for security related data or to perform a security risk mitigation action.

In step 472, a search query is received. The search query is provided by an end user of a data security system, such as the end user 199 in FIG. 1A. In step 474, a query embedding is generated using the search query. In one example, the query embedding is generated using a security embedding generation engine, such as the security embedding generation engine 194 in FIG. 1A. The security embedding generation engine generates embeddings using a security embedding generation LLM, such as the security embedding generation LLM 132 in FIG. 1B. In step 476, security data is identified (e.g., at least one security document that stored the security data is identified). The security data includes a first log line and a second log line. In some cases, the security data includes one or more security logs, alerts, and other electronic documents storing threat intelligence and security related information. As examples, the security data includes a security log that records various security events, file deletions, successful and unsuccessful login attempts, and authentication successes and failures. In some cases, the security data is identified based on the search query itself or identified using additional information provided by an end user of the data security system (e.g., the end user specifies a collection of security documents to be searched).

In step 478, a first log line embedding corresponding with the first log line is generated using the first log line. In step 480, a second log line embedding corresponding with the second log line is generated using the second log line. In one example, the first log line embedding and the second log line embedding are generated using a security embedding generation engine, such as the security embedding generation engine 194 in FIG. 1A.

In step 482, a first embedding distance between the query embedding and the first log line embedding is determined and a second embedding distance between the query embedding and the second log line embedding is determined. In some cases, the embedding distance corresponds with a Euclidean distance, a cosine similarity distance, or a distance metric for measuring the proximity between two vectors in a vector space.

In step 484, at least one relevant log line out of the security data is identified based on the first embedding distance, the second embedding distance, and a threshold prompt length. In one example, the threshold prompt length corresponds with a maximum number of tokens allocated to log lines for a prompt or corresponds with a maximum number of log lines that are used by an input prompt for a generative model. In some cases, the at least one relevant log line comprises a set of relevant log lines that correspond with the closest log line embeddings to the query embedding for the search query. In step 486, a prompt is generated using the at least one relevant log line. In step 488, a response corresponding with a search query is generated using the prompt and the generative model. In some cases, the response is outputted as displayed text or an electronic transmission. In other cases, the response is stored using a data storage device or a data storage layer.

In some embodiments, a security risk mitigation action is performed by a data security system based on the response. In one embodiment, in response to detection that the response identifies that an unauthorized access to a computing system or electronic file has occurred, the data security system may change access rights to the computing system or file permissions for the electronic file. In one example, the change in access rights may prevent a username associated with the unauthorized access from accessing the computing system or viewing the electronic file until additional authentication procedures have been performed. In another embodiment, in response to detection that the response identifies a denial-of-service attack, the data security system may cause IP traffic from sources identified in response to be blocked or rate limited. In this case, the security risk mitigation action comprises blocking or reducing IP traffic from the sources identified in the response.

At least one embodiment of the disclosed technology includes a storage device configured to store security data and one or more processors in communication with the storage device. The one or more processors are configured to receive a search query; generate, using the search query, a query embedding; identify the security data, the security data includes a first log line and a second log line; generate a first log line embedding corresponding with the first log line; generate a second log line embedding corresponding with the second log line; determine a first embedding distance between the query embedding and the first log line embedding; determine a second embedding distance between the query embedding and the second log line embedding; identify at least one relevant log line from the security data based on the first embedding distance, the second embedding distance, and a threshold prompt length; generate a prompt using the at least one relevant log line; generate, using the prompt, a response corresponding with the search query; and perform a security risk mitigation action based on the response.

At least one embodiment of the disclosed technology includes a storage device configured to store a large language model and one or more processors in communication with the storage device. The one or more processors are configured to receive a search query; generate, using the search query, a query embedding; identify security data, the security data includes a first log line and a second log line; generate a first natural language description corresponding with the first log line and a second natural language description corresponding with the second log line; generate, using the first natural language description, a first log line embedding; generate, using the second language description, a second log line embedding; determine a first embedding distance between the query embedding and the first log line embedding; determine a second embedding distance between the query embedding and the second log line embedding; identify at least one relevant log line based on the first embedding distance, the second embedding distance, and a threshold prompt length; generate a prompt using the at least one relevant log line; generate, using the prompt, a response corresponding with the search query; and perform a security risk mitigation action based on the response.

In some cases, the at least one processor is configured to generate, using a generative model, the first natural language description for the first log line. In some cases, the at least one processor is configured to generate the response using a generative model with a maximum prompt length equal to the threshold prompt length At least one embodiment of the disclosed technology includes a storage device configured to store a large language model and one or more processors in communication with the storage device. The one or more processors are configured to receive security data, the security data includes a plurality of log lines; determine a prompt; generate, using the prompt, a plurality of natural language descriptions corresponding with the plurality of log lines; determine a plurality of template identifiers; generate, using the plurality of template identifiers, positive pairings and negative pairings of the plurality of natural language descriptions corresponding with the plurality of log lines; and train the large language model using the positive pairings and the negative pairings.

In some cases, the positive pairings include a first pairing of the plurality of natural language descriptions corresponding with a first log line and a second log line of the plurality of log lines, the negative pairings include a second pairing of the plurality of natural language descriptions corresponding with a third log line and a fourth log line of the plurality of log lines, and the at least one processor is configured to fine-tune the large language model such that the large language model generates similar embeddings with at most a first embedding distance given the first pairing and generates different embeddings with at least a second embedding distance greater than the first embedding distance given the second pairing.

At least one embodiment of the disclosed technology includes receiving security data; determining a prompt; generating, using the prompt, a natural language description corresponding with each log line within the security data; determining a first plurality of template identifiers; generating, using the first plurality of template identifiers, positive pairings and negative pairings of the log lines within the security data; and fine-tuning the large language model using the positive pairings and the negative pairings; and storing the large language model.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the phrases "a first object corresponds with a second object" and "a first object corresponds to a second object" may refer to the first object and the second object being equivalent, analogous, or related in character or function.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, and U.S. patent applications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a storage device configured to store a large language model; and
    at least one processor in communication with the storage device that is configured to:
        receive security data, the security data includes a plurality of log lines;
        map a first log line of the plurality of log lines to an event identifier associated with a type of security event;
        set a window size for the first log line of the plurality of log lines based on the event identifier for the first log line;
        partition the first log line based on the window size;
        determine a prompt for generating a plurality of natural language descriptions corresponding with the plurality of log lines;
        generate, using the prompt, the plurality of natural language descriptions corresponding with the plurality of log lines;
        determine a plurality of template identifiers based on similarity between natural language descriptions of the plurality of natural language descriptions;
        generate, using the plurality of template identifiers, positive pairings and negative pairings of the plurality of natural language descriptions corresponding with the plurality of log lines;
        train the large language model using the positive pairings and the negative pairings;
        generate, using the large language model, a response that identifies a cyber attack; and
        perform a security risk mitigation action based on the response.

2. The system of claim 1, wherein:
    the positive pairings include a first pairing of the plurality of natural language descriptions corresponding with a first log line and a second log line of the plurality of log lines;
    the negative pairings include a second pairing of the plurality of natural language descriptions corresponding with a third log line and a fourth log line of the plurality of log lines; and
    the at least one processor is configured to fine-tune the large language model such that the large language model generates similar embeddings with at most a first embedding distance given the first pairing and generates different embeddings with at least a second embedding distance greater than the first embedding distance given the second pairing.

3. The system of claim 2, wherein:
    the first embedding distance corresponds with a cosine similarity distance; and
    the prompt comprises natural language text that is determined based on a type of security document storing the security data.

4. The system of claim 1, wherein:
the positive pairings include a first pairing corresponding with a first pair of log lines of the plurality of log lines;
the negative pairings include a second pairing corresponding with a second pair of log lines of the plurality of log lines; and
the at least one processor is configured to fine-tune the large language model such that the first pairing are given similar embeddings within a first embedding distance while the second pair are given different embeddings with a second embedding distance greater than the first embedding distance.

5. The system of claim 1, wherein:
the at least one processor is configured to fine-tune the large language model to generate embeddings given the positive pairings and the negative pairings as inputs to the large language model.

6. The system of claim 1, wherein:
the at least one processor is configured to generate, using the plurality of template identifiers, a first grouping of log lines out of the plurality of log lines.

7. The system of claim 6, wherein:
the at least one processor is configured to generate the first grouping of log lines based on syntactic and semantic similarity between the log lines within the first grouping of log lines.

8. The system of claim 1, wherein:
the at least one processor is configured to detect that a second plurality of template identifiers should be used to update the positive pairings and the negative pairings; and
the at least one processor is configured to fine-tune the large language model using the updated positive pairings and the updated negative pairings.

9. The system of claim 1, wherein:
the at least one processor is configured to utilize a generative model to generate a first natural language description for the first log line of the plurality of log lines.

10. The system of claim 1, wherein:
the large language model comprises a security specific large language model; and
the at least one processor is configured to fine-tune the security specific large language model using the positive pairings and the negative pairings.

11. The system of claim 1, wherein:
the at least one processor is configured to determine the plurality of template identifiers based on syntactic and semantic similarity between the natural language descriptions of the plurality of natural language descriptions; and
the at least one processor is configured to detect that the response identifies a denial-of-service attack and the security risk mitigation action comprises blocking IP traffic from sources identified in the response.

12. A method, comprising:
receiving security data, the security data includes a plurality of log lines;
mapping a first log line of the plurality of log lines to an event identifier associated with a type of security event;
setting a window size for the first log line of the plurality of log lines based on the event identifier for the first log line;
partitioning the first log line based on the window size;
determining a prompt for generating a plurality of natural language descriptions corresponding with the plurality of log lines;
generating, using the prompt, the plurality of natural language descriptions corresponding with the plurality of log lines;
determining a plurality of template identifiers based on similarity between natural language descriptions of the plurality of natural language descriptions;
generating, using the plurality of template identifiers, positive pairings and negative pairings of the plurality of natural language descriptions;
fine-tuning a large language model using the positive pairings and the negative pairings, the fine-tuning the large language model includes fine-tuning the large language model such that the positive pairings are given similar embeddings with at most a first embedding distance while the negative pairings are given different embeddings with at least a second embedding distance greater than the first embedding distance;
storing the large language model;
generating, using the large language model, a response that identifies a cyber attack; and
performing a security risk mitigation action based on the response.

13. The method of claim 12, further comprising:
detecting that a second plurality of template identifiers should be used to update the positive pairings and the negative pairings;
updating, using the second plurality of template identifiers, the positive pairings and the negative pairings; and
fine-tuning the large language model using the updated positive pairings and the updated negative pairings.

14. The method of claim 12, wherein:
the first embedding distance corresponds with a cosine similarity distance;
the large language model is stored using a data storage device; and
the security risk mitigation action comprises blocking IP traffic from sources identified in the response.

* * * * *